United States Patent [19]
Genho, Sr.

[11] 4,333,242
[45] Jun. 8, 1982

[54] CONSTRUCTION LASER

[75] Inventor: Robert K. Genho, Sr., Houston, Tex.

[73] Assignee: Lasertron Company, Houston, Tex.

[21] Appl. No.: 36,663

[22] Filed: May 7, 1979

[51] Int. Cl.³ .......................... G02B 7/14; G01B 11/26
[52] U.S. Cl. ....................................... 33/227; 33/290;
33/DIG. 21; 356/138
[58] Field of Search ............... 33/290, 227, DIG. 21,
33/291; 356/138, 146

[56] References Cited

U.S. PATENT DOCUMENTS

| | | | |
|---|---|---|---|
| 2,109,044 | 2/1938 | Grieve | 33/290 |
| 2,198,836 | 4/1940 | Patton . | |
| 2,346,006 | 4/1944 | Burt . | |
| 2,376,700 | 5/1945 | Kinney . | |
| 3,300,861 | 1/1964 | Lilly . | |
| 3,446,560 | 5/1969 | Brasier . | |
| 3,528,748 | 9/1970 | Burch et al. . | |
| 3,588,249 | 6/1971 | Studebaker | 33/290 |
| 3,813,170 | 5/1974 | Sears . | |
| 3,817,624 | 6/1974 | Martin . | |
| 3,854,820 | 12/1974 | Hansen | 356/138 |
| 3,897,637 | 8/1975 | Genho | 33/290 |

FOREIGN PATENT DOCUMENTS

| | | |
|---|---|---|
| 868792 | 7/1949 | Fed. Rep. of Germany . |
| 732445 | 6/1955 | United Kingdom . |

Primary Examiner—William D. Martin, Jr.
Attorney, Agent, or Firm—David Alan Rose; Ned L. Conley

[57] ABSTRACT

An apparatus including a source of a coherent light beam of low divergence for quickly and simultaneously establishing a plurality of reference lines or planes for use in leveling, squaring, plumbing, and other alignment functions and for controlling the operation of construction equipment is disclosed. The apparatus includes feet for supporting the housing on a surface, the feet being attached to the housing through an alignment and leveling device that permits adjustment of the orientation of the housing relative to the surface. The alignment and leveling device may be controlled in part by a pair of level vials which, when the feet support the housing on a substantially horizontal surface, have substantially horizontal axis that are perpendicular to one another. The level vials actuate a motor drive servomechanism that adjusts that housing relative to the surface until the axis of each level vial is horizontal. The level vials may be made adjustable with respect to the housing so that the orientation of the housing and the direction of the first and second beams when the level vials are horizontal may be varied thus permitting control over the ultimate direction of the first and second beams.

6 Claims, 17 Drawing Figures

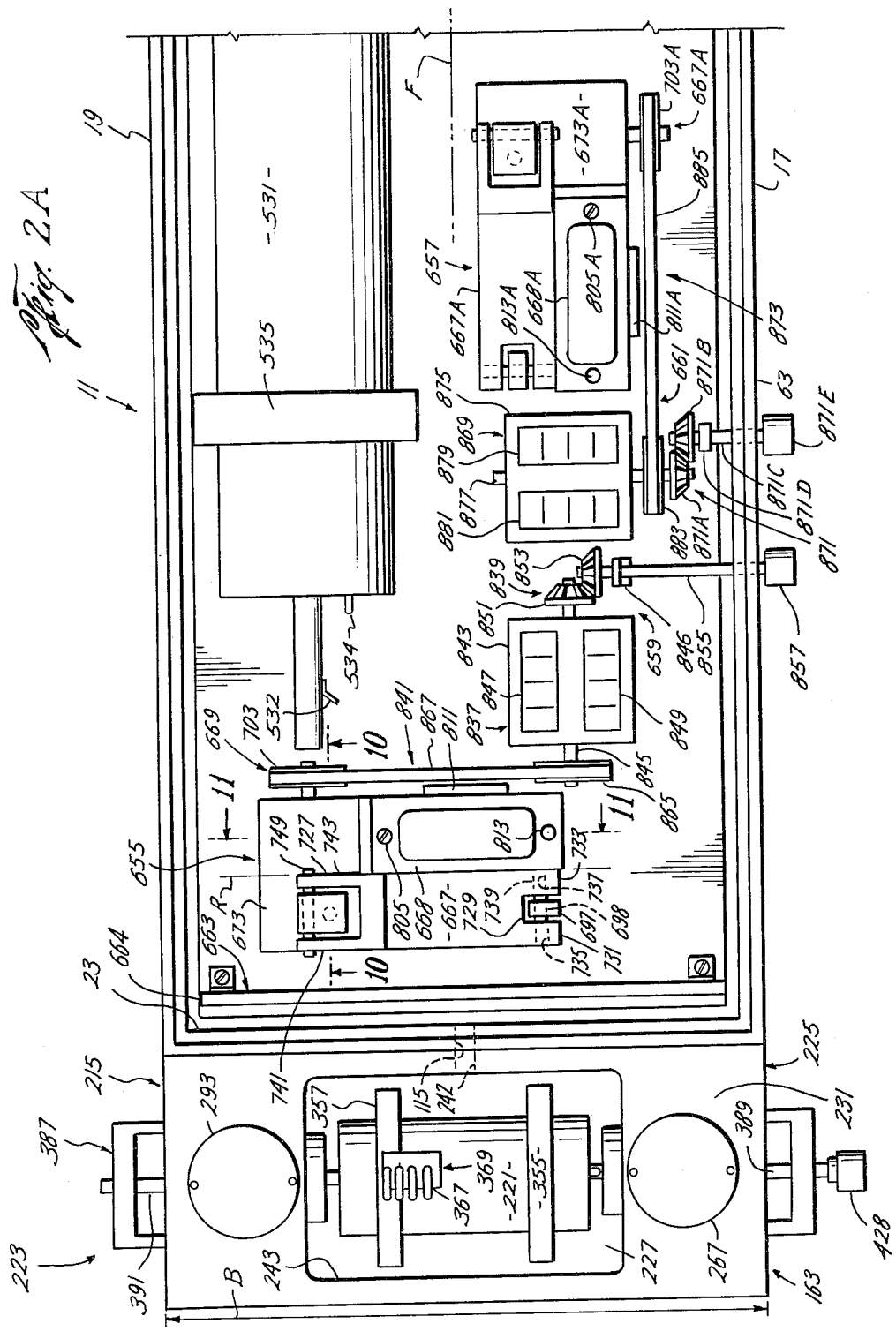

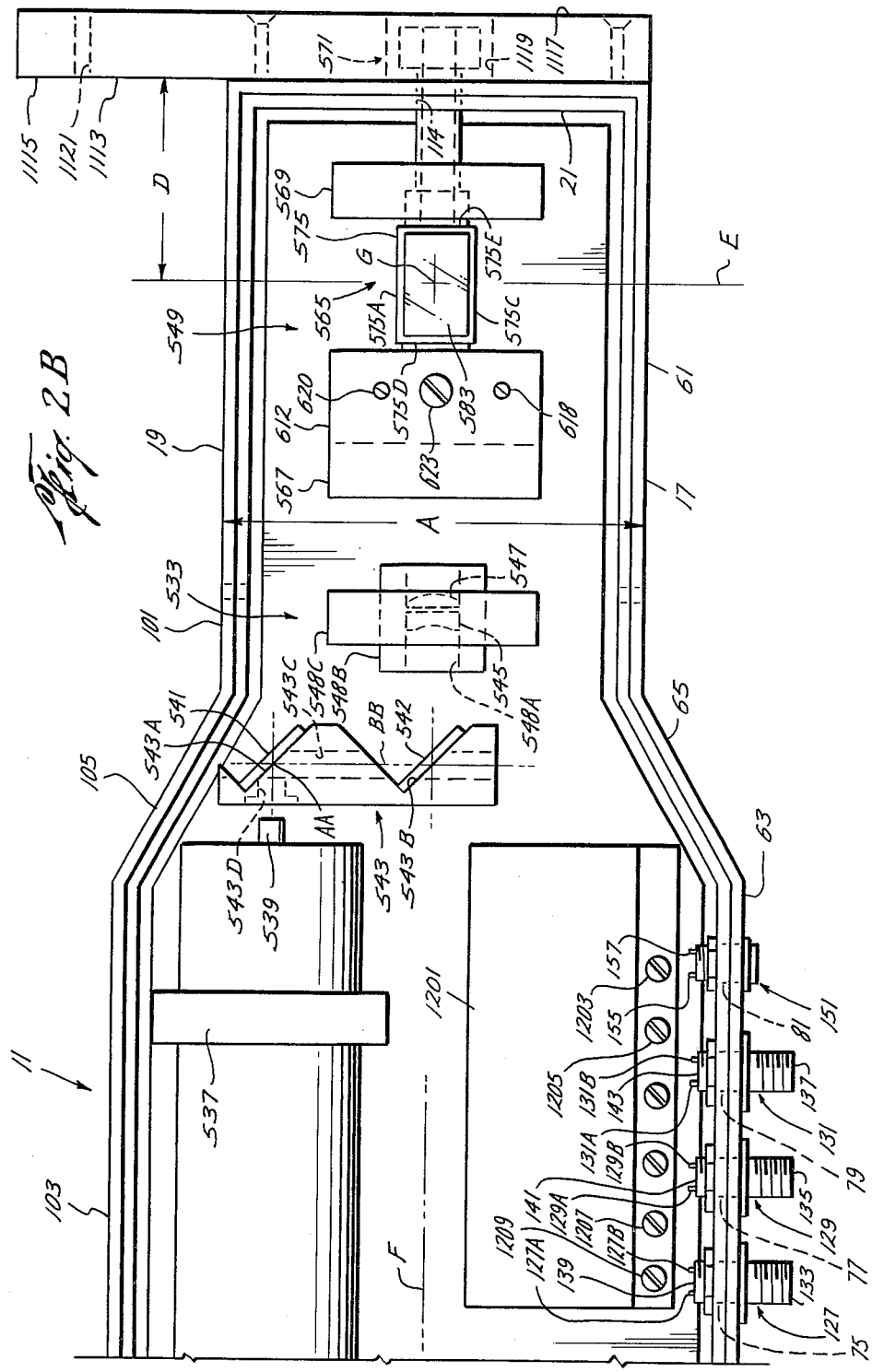

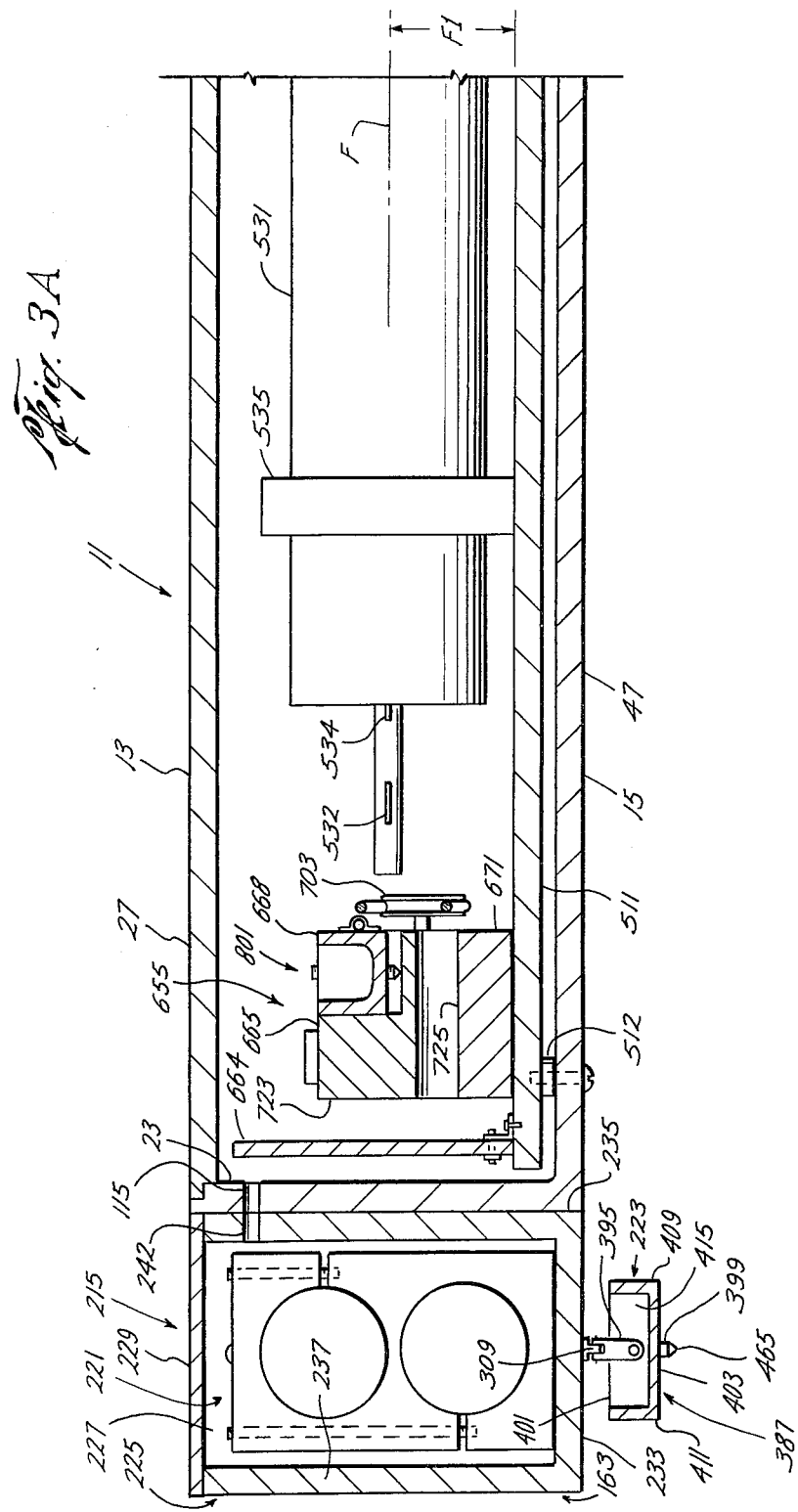

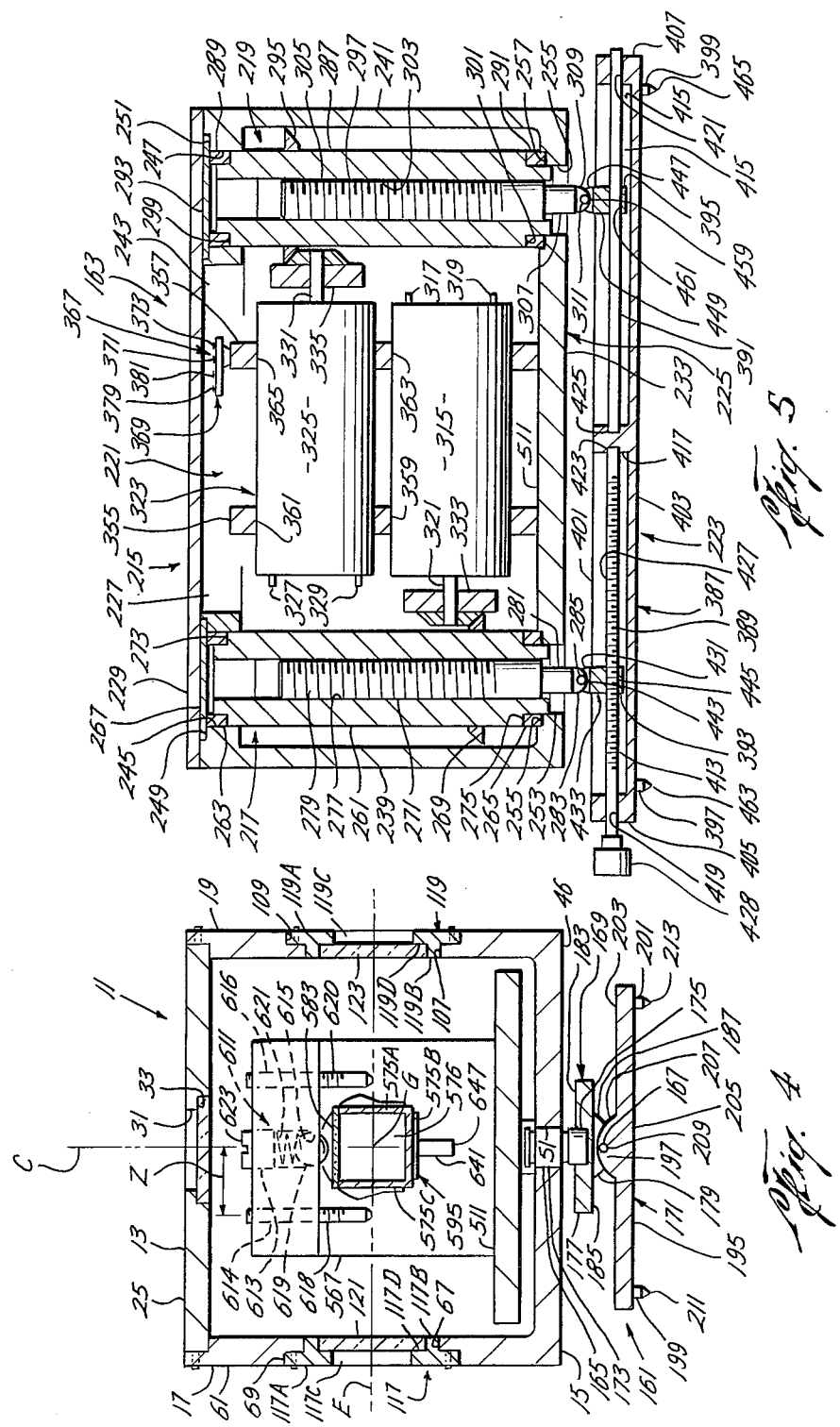

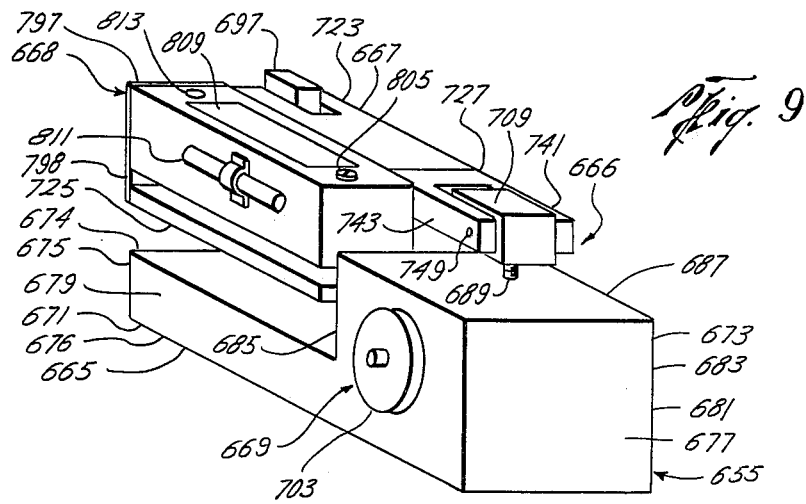
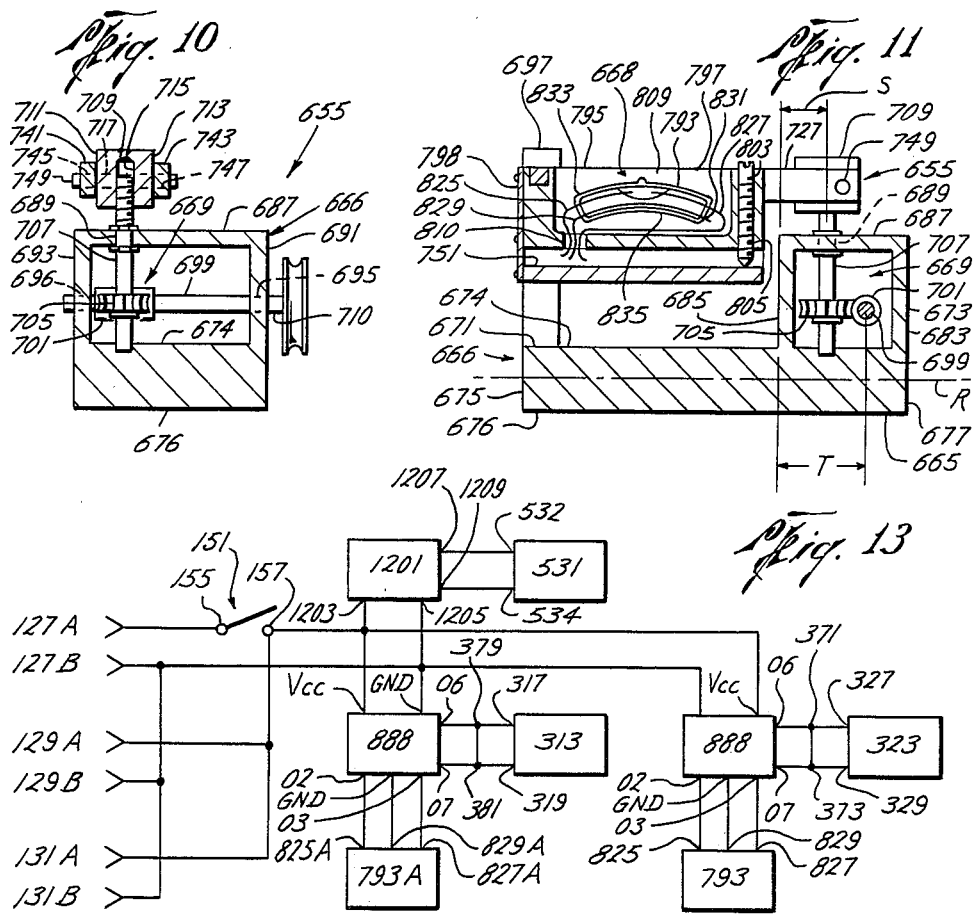

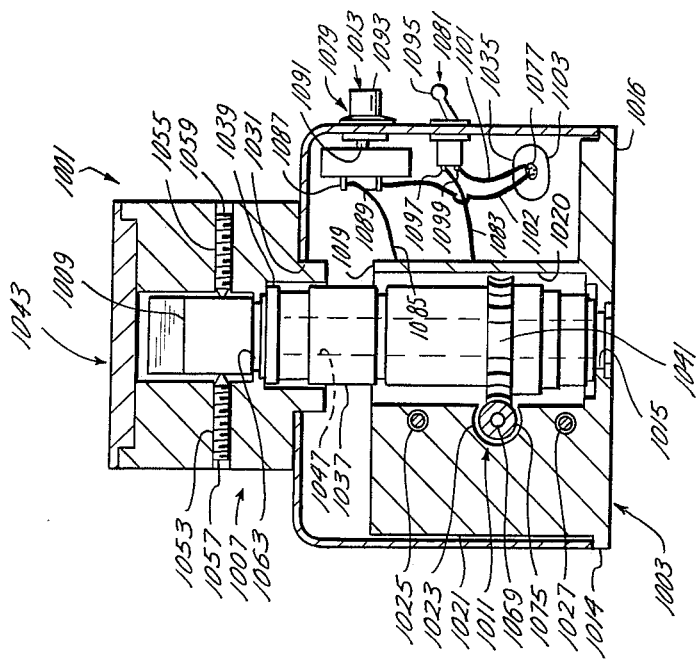
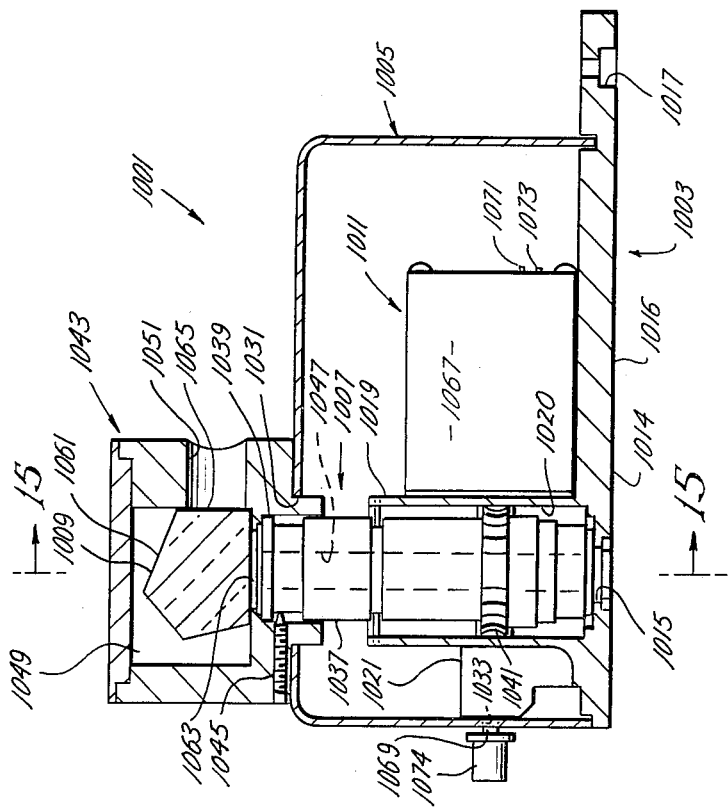

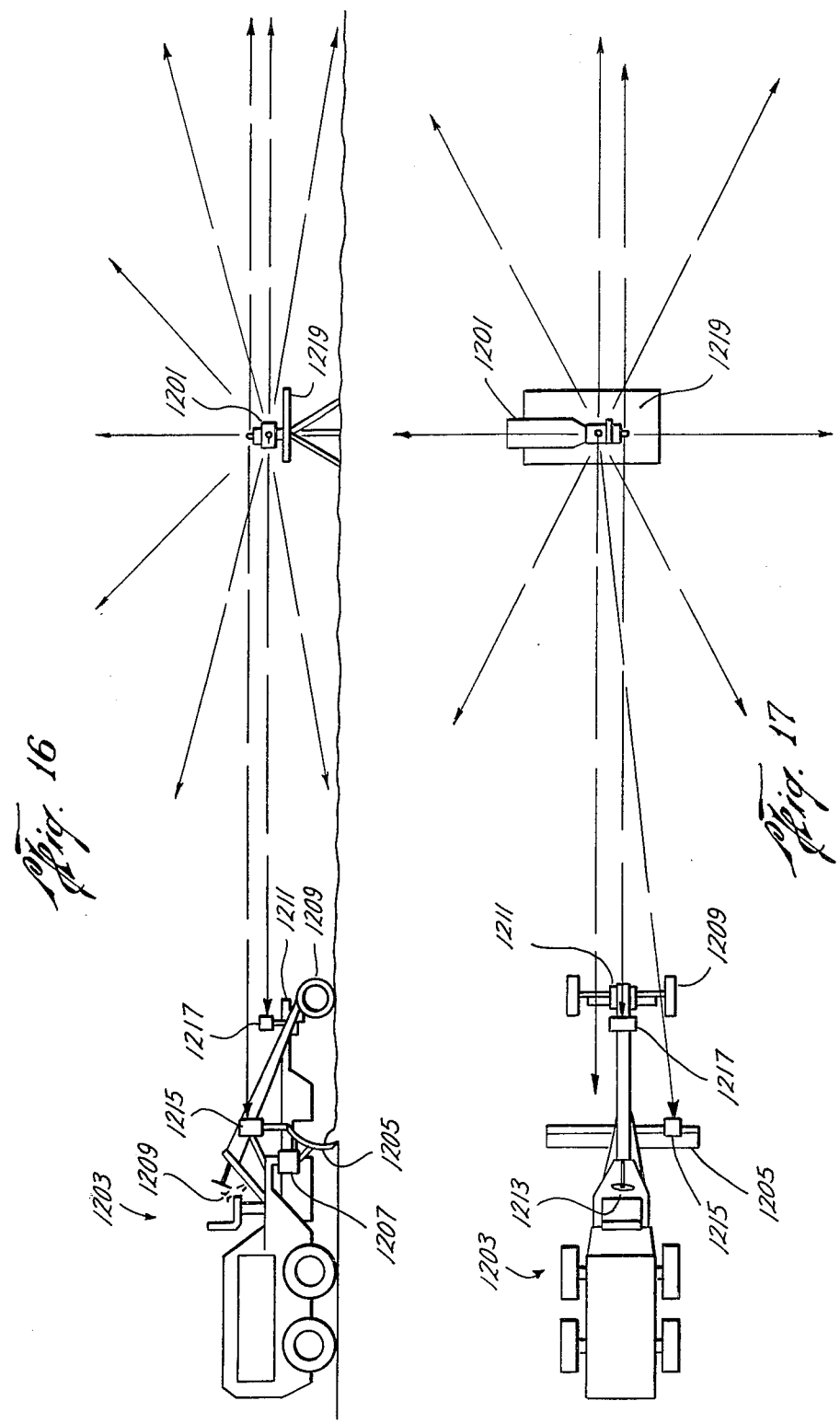

CONSTRUCTION LASER

TECHNICAL FIELD

The present invention relates generally to tools and methods for establishing reference lines and planes for facilitating various alignment operations including leveling, squaring, and plumbing and for automatically controlling the operation of construction equipment such as graders and trenchers, and more specifically to tools for providing beams of light along desired lines or rotating within desired planes, such lines and planes to be used as the aforementioned reference lines and planes and to methods for controlling construction equipment using such beams of light.

BACKGROUND ART

The establishment of desired orientational relationships of surfaces and structure components both to one another and to the vertical and horizontal is an important aspect of the construction industry. This aspect commonly includes the establishment of reference lines and planes having a desired orientation followed by the alignment of surfaces or structure components to such reference lines and planes. Therefore, in fulfilling this aspect of the construction industry, it is desirable to have a tool that quickly, easily and accurately establishes a variety of reference lines and planes in such a way that surfaces and structure components can be quickly, easily and accurately aligned with the reference lines and planes established.

In the prior art, various tools directed toward meeting this need have been developed. These tools include hand-held apparatus such as carpenter's squares, bubble levels and plumb bobs. Although reference lines may be quickly established using such hand tools, the length of such lines are limited by the physical size of such tools. As a result, accurate alignment of surfaces and structure components even slightly remote from such tools is difficult, if not impossible. In addition, the variety of reference lines provided by such tools is often limited: for example, a plumb bob can establish only a vertical reference line; most bubble levels can establish only a vertical reference line, a horizontal reference line and a reference line 45° to the horizontal; most carpenter's squares can establish only a reference line perpendicular to another line.

Also included in the prior art are more complex devices such as theodolites, including the well-known surveyor's transit. Unlike the previously identified hand tools, theodolites are capable of establishing reference lines of relatively substantial length such that surfaces and structure components can be accurately aligned to such reference lines. Both the establishment of the reference lines and the alignment of surfaces and structure components to such reference lines, however, are fairly difficult and time consuming. Establishment of the reference lines includes careful positioning of a tripod and adjustment of several screw-type knobs to establish level. Then, two operators are needed to align objects along the reference line: one operator must be positioned at the theodolite or transit to view the reference line by sighting through the telescope of the theodolite, and a second operator must physically align the object in accordance with the first operator's instructions. Furthermore, theodolites are capable of establishing only a single reference line at a time. Thus, a reference plane can be established only approximately by establishing and marking a series of reference lines a single line at a time. Such marking is commonly accomplished through the use of stakes with string tied between them.

More recently, tools capable of providing optical outputs in the form of beams of light have been developed in the prior art. These tools often have adjustment devices and direction indicators such as level bubble vials and angular graduations so that the orientation of the beam or beams can be set as desired. Furthermore, the beam is generally provided by a laser since laser beams can be produced to have high coherence, low divergence and high intensity over relatively long distances. Thus, these tools offer advantages over theodolites in that they provide a well-defined reference line that can be received and interpreted at relatively large distances from the laser itself. Because of this remote indication capability, alignment of objects with the beam does not require an operator at the laser itself. Instead, a remote operator can align an object with the reference line established by the beam merely by moving the object until the beam strikes the object at the desired location. Furthermore, multiple reference lines having a desired relationship to one another can be established simultaneously using beamsplitters. Similarly, reference planes can be established using rotating reflectors. Various lasers developed heretofore for use in establishing reference lines and planes are shown in U.S. Pat. Nos. 3,528,748 issued Sept. 15, 1970, to Burch et al; 3,588,249 issued June 28, 1971, to Studebaker; 3,813,170 issued May 28, 1974, to Sears; and 3,897,637 issued Aug. 5, 1975, to Genho.

Burch et al shows the use of a double imaging system for aligning a laser beam after it has been focused on a target. Burch also shows the use of photoelectric methods for determining the position of laser beams with respect to a target.

Studebaker shows the use of a laser beam for automatically controlling grading level of an earth grader through the use of photosensitive target in combination with a servomechanism for controlling the flow of hydraulic fluid. The photosensitive target includes two vertically spaced photocells with a neutral zone in the space between the photocells. Studebaker also shows reflecting a vertical laser beam using a rotating pentaprism for establishing a horizontal reference plane. In addition, Studebaker shows reflecting a horizontal beam using a 45° rotating reflector for establishing a vertical reference plane. Studebaker further shows a means for adjustably mounting a laser in a substantially vertical position. The laser is permanently secured to a tripod by means of a ball-and-socket joint. Level adjustments are made by screw means with bubble vials as a reference. The bubble vials are adjustable with respect to the laser so that a reference plane having a desired angular relationship to the grade can be established by adjusting a micrometer. Fine elevation adjustments are made by means of a rotatable spur gear cooperating with a rack gear.

Sears shows splitting the laser beam using one or more apertured 45° reflectors. One of the resulting beams is used for positioning the laser device over a reference point on the ground. Sears also shows the use of two horizontal reference beams whose angular relationship is fixed by the design of the particular device. In addition, Sears shows gear means for manually adjusting the horizontal beams simultaneously to different directions within a horizontal plane.

Genho shows the use of a reflective-transmittive 45° beamsplitters for transmitting either two or three orthagonal beams that can be used for squaring, leveling and plumbing. Genho also shows means for changing the position of one of the beams from horizontal to vertical by rotating the laser housing with respect to an adjustable support means. The support means includes two feet separately, threadedly mounted in a block that is rotatably and translatably attached to the housing. Genho also shows the use of a detachable rotatable reflecting pentaprism for establishing either a horizontal or a vertical reference plane.

While the prior art shows such tools capable of providing simultaneously a plurality of reference lines having a desired relationship to one another and of providing a reference plane having a desired orientation, none of the prior art shows a device that can be placed on any reasonably flat, substantially horizontal surface so as to provide a substantial selectable variety of reference lines and planes without requiring either substantial initial manual adjustment and leveling or substantial releveling and repositioning of the device when changing from one line or plane or set of lines and/or planes to another set of lines and/or planes. Such a device is desirable since it enables the performance of a wide variety of alignment functions and related activities while the device remains accurately positioned over a single reference point without any time consuming readjustments and releveling. Furthermore, such a device is desirable since, by providing a plurality of reference planes, it can be used to control the total operation of a piece of construction equipment.

DISCLOSURE OF THE INVENTION

The apparatus of the present invention is a tool capable of producing a plurality of reference planes having a desired relationship to one another without requiring substantial initial adjustment or leveling while assuring accuracy of orientation of the planes to the degree that a piece of construction equipment can be used to perform desired functions without the need of a continuous operator. Furthermore, the apparatus of the present invention is a tool capable of providing reference planes and lines in a variety of directions without substantially altering the position of the apparatus thus providing accurate relationships between the various reference lines and planes while the apparatus remains positioned at a single reference point.

The apparatus includes a housing containing a source of a coherent light beam of low divergence, such as a laser; a beamsplitter for splitting the beam generated by the source into a first and second beam away from the housing in directions that are perpendicular to one another; first and second reflectors for reflecting the first and second beams, respectively, at a desired angle; and first and second rotators for rotating the first and second reflectors, respectively, so that the reflected first and second beams rotate in first and second planes. The beamsplitter may be an internal transmittal pentaprism whereby the first and second beams are perpendicular to one another.

The apparatus may further include a device for rotating the beamsplitter to a plurality of discrete positions so that the direction of the first beam changes with respect to the housing while the direction of the second beam remains fixed with respect to the housing.

The apparatus may additionally include feet for supporting the housing on a surface, the feet being attached to the housing through an alignment and leveling device that permits adjustment of the orientation of the housing relative to the surface without moving the feet relative to the surface. The alignment and leveling device may be controlled in part by a pair of level vials which, when the feet support the housing on a substantially horizontal surface, have substantially horizontal axes that are perpendicular to one another. The level vials actuate a motor drive servomechanism that adjusts the housing relative to the surface until the axis of each level vial is horizontal. The level vials may be made adjustable with respect to the housing so that the orientation of the housing and the direction of the first and second beams when the level vials are horizontal may be varied thus permitting control over the ultimate direction of the first and second beams.

The method of the invention includes positioning the housing such that the first beam is reflected and rotated in a vertical plane or sloped a desired angle from the vertical and the second beam is reflected and rotated in a plane that is either horizontal or sloped a desired grade from the horizontal. These rotating beams are used as references to control simultaneously the line along which a piece of excavating equipment moves and the grade excavated by such piece of equipment.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 2, which includes FIGS. 2A and 2B, is a top view of the preferred embodiment of the apparatus of the invention with the top plate of the housing, the cover plate of the rear support mechanism housing and the beacon units removed;

FIG. 3, which includes FIGS. 3A and 3B, is a section of the apparatus of FIG. 1 taken along line 3—3 and with the beacon units removed;

FIG. 4 is a section of the apparatus of FIG. 1 taken along line 4—4 with the beacon units removed;

FIG. 5 is a section of the apparatus of FIG. 1 taken along line 5—5;

FIG. 9 is a detailed pictorial view of one of the level actuators of the preferred embodiment of the apparatus of the invention;

FIG. 10 is a section of the actuator of FIG. 9 taken along line 10—10 as shown in FIG. 2A;

FIG. 11 is a section of the actuator of FIG. 9 taken along line 11—11 as shown in FIG. 2A;

FIG. 13 is a block diagram illustrating the interconnection wiring of the preferred embodiment of the apparatus of the invention;

FIG. 14 is a section of a beacon unit as shown in FIG. 1 taken along line 13—13;

FIG. 15 is a section of a beacon unit as shown in FIG. 14 taken along line 14—14; and FIGS. 16 and 17 are pictorial illustrations of the apparatus of the invention used in accordance with the preferred method of the invention.

BEST MODE FOR CARRYING OUT THE INVENTION

1. Introduction

Figure 1:
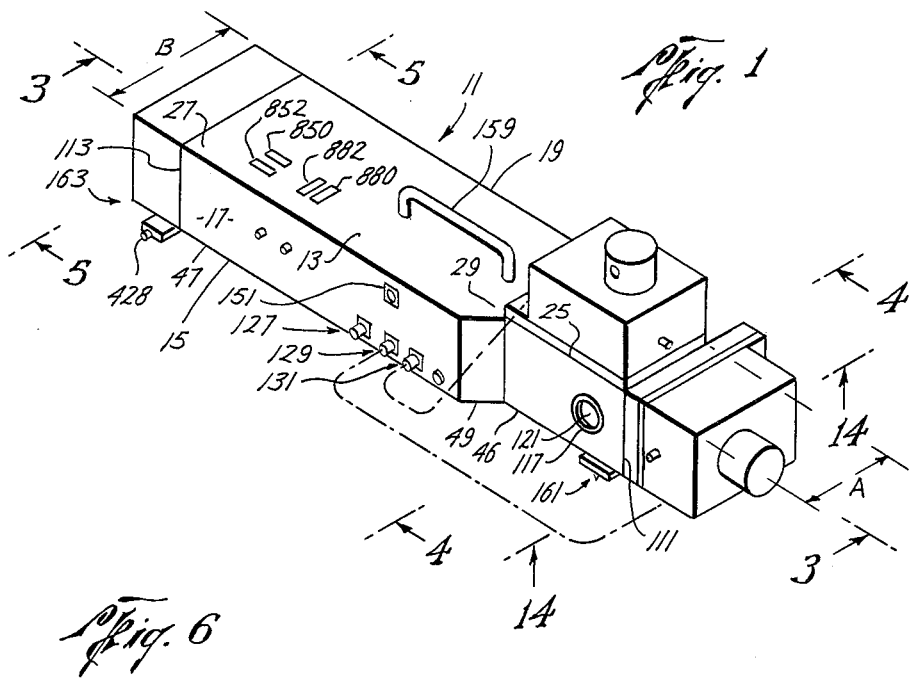
FIG. 1 is a pictorial external view of the preferred embodiment of the apparatus of the invention.

The preferred embodiment of the apparatus of the invention includes seven major components: (1) a housing for containing and protecting many of the vital components of the apparatus; (2) a support mechanism, controlled by electric motors, for supporting the housing on a surface such that the orientation of the housing with respect to the surface can be varied; (3) an optical bench disposed within the housing for supporting many of the vital components of the apparatus in a desired orientation with respect to one another; (4) a light source and optics system that provides first and second laser beams that are directed along paths that are perpendicular to one another, the path of the first beam being variable to three discrete directions with respect to the housing while the direction of the path of the second beam is substantially fixed with respect to the housing; (5) a level control mechanism for controlling the orientation of the housing with respect to the surface by controlling movement of the electric motors of the support mechanism; (6) a pair of beacon units supported by the housing along the paths of the first and second beams, the beacons including rotating reflectors for rotating the beams in a pair of perpendicular planes; and (7) a power supply system for supplying power to the light source and optics system; the level control mechanism and the beacon units. The configuration and specific operation of each of these components will be described hereinafter under separate headings. The overall operation of the apparatus is described after the description of the individual components. The preferred manner of performing the method of the invention is set forth in the description of the operation of the apparatus.

In the following detailed description of the preferred embodiment of the apparatus of the invention, specific dimensional information, such as dimensions of component parts and dimensions establishing relative orientation of component parts is set forth. It has been found that when the apparatus includes such dimensions, either approximately or exactly, or includes the same or similar dimensional ratios, the apparatus is especially useful in fulfilling the objects of the invention. But, while such specific dimensions and dimensional relationships are preferred and inventive in themselves, especially when used in combination in the entire apparatus, other dimensions and dimensional relationships may be used while still incorporating the spirit of the present invention in its broadest scope.

2. Housing

Referring to FIGS. 1–4, the preferred embodiment of the apparatus of the invention includes housing 11 comprising top 13, bottom 15, left wall 17, right wall 19, front wall 21 and rear wall 23.

Top 13 has a flat elongate configuration that is symmetrical about an axis and includes (1) rectangular front portion 25 having width A, which may be, for example, 4 inches (10.16 cm.), and a length that is approximately one-fourth of the overall length of top 13; (2) rectangular rear portion 27 having width B, which may be, for example, 6 inches (15.24 cm.), that is visibly greater than width A and a length that is approximately two-thirds of the overall length of top 13; and (3) trapezoidal intermediate portion 29 extending between front portion 25 and rear portion 27, the width of portion 29 varying between width A adjacent front portion 25 and width B adjacent rear portion 27. The overall length of top segment 13 may be, for example, 22 inches (55.88 cm.).

Top plate 13 has a circular passage 31 having counterbore 33 extending through front portion 25. The axis of passage 31 is coincident with axis C which extends perpendicular to and intersects the axis of plate 13 at distance D from front edge 35 of plate 13. Preferably, passage 31 has a diameter of 0.85 inch (2.159 cm.), and counterbore 33 has a diameter of 1 inch (2.54 cm.) and a depth of 0.125 inch (0.3175 cm.).

Bottom 15 has a geometrical and dimensional configuration that is substantially identical to that of top 13. Thus, bottom 15 has front portion 46, rear portion 47, and intermediate portion 49. Bottom 15 has circular passage 51 extending perpendicularly through front portion 46. The axis of passage 51 intersects the axis of bottom 15 the distance D from front edge 53 of bottom 15. Preferably, the diameter of passage 51 is 0.375 inch (0.9525 cm.).

Bottom 15 is spaced below top 13 and is parallel to and aligned with top 13 such that the axes of top 13 and bottom 15 are both within a single plane that is perpendicular to the planes of top 13 and bottom 15 and such that the axis of passage 51 is coaxial with axis C. A preferred spacing between top 13 and bottom 15 is 3.5 inches (8.89 cm.).

Left wall 17 extends perpendicularly between top 13 and bottom 15 such that the top of wall 17 adjoins the left edge of top 13 along the entire length of top 13 and the bottom of wall 17 adjoins the left edge of bottom 15 along the entire length of bottom 15. Because of the varying widths of top 13 and bottom 15, wall 17 will be bent so that wall 17 has front portion 61, rear portion 63, and intermediate portion 65.

Wall 17 has circular passage 67 having counterbore 69 extending perpendicularly through front portion 61. The axis of passage 67 is coincident with axis E which perpendicularly intersects both axis C and the symmetrical axis of left wall 17.

Wall 17 further has circular passages 75, 77, 79, 81 extending perpendicularly through rear portion 63 of wall 17. Passages 75, 77, 79 are positioned proximate to one another toward the front of rear portion 63 and are positioned at equal distances above bottom 15. Passage 81 is positioned above passages 75, 77, 79. Passages 75, 77, 79, 81 have a diameter of 0.85 inch (2.159 cm.).

Right wall 19 extends perpendicularly between top 13 and bottom 15 such that the top of wall 19 abuts the right edge of top 13 along the entire length of top 13 and the bottom of wall 19 abuts the right edge of bottom 15 along the entire length of bottom 15. Because of the varying widths of top 13 and bottom 15, wall 19 will be bent so that wall 19 has front portion 101, rear portion 103 and intermediate portion 105.

Wall 19 has circular passage 107, having counterbore 109, extending perpendicularly through front portion 101. The axis of passage 107 is coincident with axis E.

In accordance with the foregoing description of top 13, bottom 15 and walls 17, 19, it can be seen that plates 13, 15 and walls 17, 19 form a tube having an axis F about which top 13, bottom 15 and walls 17, 19 are symmetrically arranged and having front end 111 formed by the front edges of top 13, bottom 15 and walls 17, 19 and rear end 113 formed by the rear edges of top 13, bottom 15 and walls 17, 19. Front wall 21 is secured to and covers front end 111. Rear wall 22 is secured to and covers rear end 113. Preferably, bottom wall 15, left wall 17, right wall 19, front wall 21 and rear wall 23 are cast in aluminum as a five-sided unit with an open top, all parts being 0.25 inch (0.635 cm.) thick. Top 13 is preferably made from 0.25 inch (0.635 cm.) sheet aluminum and is removably attached to the top of such five-sided unit by means of screws. In this way, access to the inside of housing 11 is provided.

Front plate 21 has passage 114 extending therethrough coaxial with axis F. Rear plate 23 has wire passage 115 extending therethrough.

Furthermore, in accordance with the foregoing description of housing 11, it can be seen that axes C, E and F all perpendicularly intersect one another at point G spaced distance D along axis F from front end 111.

Housing 11 further includes glass disc 116 having a diameter greater than that of passage 31 and less than that of counterbore 33 secured within counterbore 33 using an adhesive such as RTV.

Housing 11 also includes window mounts 117, 119 having disc-shaped portions 117A, 119A and concentric annular flange portions 117B, 119B, respectively. Disc-shaped portions 117A, 119A have diameters less than that of counterbores 69, 109, respectively, and greater than that of passages 67, 107, respectively. Flange portions 117B, 119B have diameters slightly less than passages 67, 107, respectively. Window mounts 117, 119 are mounted on walls 17, 19, respectively, such that disc-shaped portions 117A, 119A are disposed in counterbores 69, 109, respectively, and flange portions 117B, 119B are disposed in passages 67, 107, respectively. Window mounts 117, 119 are secured to walls 17, 19, respectively, by screws extending through disc-shaped portions 117A, 119A and threaded into the bases of counterbores 69, 109.

Window mounts 117, 119 further include passages 117C, 119C extending through disc-shaped portions 117A, 119A, respectively, and concentric therewith. The diameters of passages 117C, 119C are slightly less than the inside diameters of flange portions 117B, 119B, respectively, whereby annular lands 117D, 119D are formed. Window mounts 117, 119 also include glass discs 121, 123, respectively, having diameters intermediate the inside diameter of flange portions 117B, 119B, respectively, and the diameter of passages 117C, 119C, respectively, and secured to bands 117D, 119D by an adhesive such as RTV.

Housing 11 also includes two-pin female connectors 127, 129, 131, having connector portions 133, 135, 137 and terminal lug portions 139, 141, 143, respectively. Connectors 127, 129, 131 are mounted on left wall 17 adjacent passages 75, 77, 79, respectively, such that the terminal lug portions extend into housing 11 and such that the connector portions face outwardly from wall 17. Connectors 127, 129, 131 each have a terminal lug A and a terminal lug B. Preferably, connector portions 133, 135, 137 include means for securely maintaining a connection between the corresponding connectors and a female connector mated thereto. Such means is shown in FIGS. 1 and 2 as externally threaded cylindrical flanges.

Housing 11 additionally includes a single pole, single-throw, key-operated switch 151 having keyhole 153 and terminal lugs 155, 157. Switch 151 is secured within passage 81 such that keyhole 153 faces outwardly from housing 11 and terminal lugs 155, 157 extend into housing 11.

Housing 11 further includes handle 159 secured to rear portion 27 of top 13 along the axis of top 13.

3. Support Mechanism

Referring to FIGS. 1–6, the preferred embodiment of the apparatus of the invention includes a support mechanism comprising front support unit 161 and rear support unit 163.

Front support unit 161 includes pivot pins 165, 167, upper pivot block 169 and lower pivot block 171.

Pivot pin 165 has end 173 rotatably secured within passage 51 of bottom 15 of housing 11 and end 175 extending perpendicularly below bottom 15.

Upper pivot block 169 includes body 177 and lugs 179, 181. Body 177 is an elongate right rectangular hexahedron having upper surface 183 and lower surface 185. Body 177 is attached to end 175 of pivot pin 165 at the geometrical center of upper surface 183 such that upper surface 183 is parallel to and spaced slightly below bottom 15 of housing 11. Lugs 179, 181 extend perpendicularly from opposite sides of lower surface 185, both lugs being axially centered with respect to body 177. Lugs 179, 181 have rounded ends 187, 189, respectively, facing away from lower surface 185 and coaxial pin passages 191, 193, respectively, therethrough. The axis of passages 191, 193 is perpendicular to the axis of body 177 and perpendicularly intersects the axis of pivot pin 165.

Lower pivot block 171 includes base 195, lug 197 and feet 199, 201. Base 195 is an elongate right rectangular hexahedron having upper surface 203 and lower surface 205. Lug 197 extends perpendicularly from the geometric center of upper surface 203 and has rounded end 207 facing away from upper surface 203 and pin passage 209 extending therethrough. The axis of passage 209 is perpendicular to the axis of base 195. Lug 197 is disposed between lugs 179, 181 such that pin passage 209 is coaxially aligned with passages 191, 193. Pivot pin 167 extends through passages 191, 209, 193 such that upper pivot block 169 is pivotally attached to lower pivot block 171. Feet 199, 201 have pointed ends 211, 213, respectively, and are fixedly attached to opposite ends of lower surface 205 of base 195 such that ends 211, 213 extend perpendicularly away from surface 205 an equal distance. Preferably, the axes of feet 199, 201 intersect the axis of base 195 at points spaced equally to either side of the axis of base 195.

Preferably the dimensions of the parts of front support unit 161 are such that when base 195 is parallel to bottom 15, the distance from the lower surface of bottom 15 to the tips of feet 199, 201 is 0.75 inches (1.905 cm.).

Referring to FIGS. 2, 3 and 5, rear support unit 163 includes housing unit 215, plunger mechanisms 217, 219, motor unit 221 and base unit 223.

Housing unit 215 includes right rectangular, flat, hexahedral body 225, having chamber 227 therein, and cover plate 229. Body 225 has upper side 231, lower side 233, front side 235, rear side 237, left side 239 and right side 241. Front side 235, having outer periphery geometry substantially identical with that of rear end 113 of housing 11, is attached to rear wall 23 of housing 11 such that front side 235 is aligned with rear end 113. Front side 235 further has wire passage 242 extending therethrough and aligned with passage 115 of rear wall 23. Upper side 231 has rectangular access opening 243 extending therethrough and centered with respect to upper side 231. Upper side 231 also has circular bearing passages 245, 247 extending perpendicularly therethrough between opening 243 and sides 239, 241, respectively. Passages 245, 247 have counterbores 249, 251, respectively, adjacent the outer surface of upper side 231. Lower side 233 has circular bearing passages 253, 255 extending perpendicularly therethrough coaxial with passages 245, 247, respectively, of upper side 231. Passages 253, 255 have counterbores 257, 259, respectively, adjacent the inner surface of lower side 233.

Cover plate 229 has outer periphery geometry substantially identical to upper side 231 of body 225. Cover plate 229 is removably attached to body 225 by screws extending through plate 229 and threaded into upper side 231 such that cover plate 229 is aligned with upper side 231.

Plunger mechanism 217 includes plunger cylinder 261, annular bearings 263, 265, retainer plate 267, annular bevel gear 269 and plunger rod 271. Cylinder 261 has bearing seats 273, 275 at either end and threaded passage 277, preferably having 32 threads per inch (right-handed threads), extending axially therethrough. Cylinder 261 is rotatably mounted within chamber 227 between passages 245 and 253 and is coaxial with passages 245, 253. Cylinder 261 is held in position by bearing 263, which bears between passage 245 and bearing seat 273, and bearing 265, which bears between counterbore 257 of passage 253 and bearing seat 275. The upper surface of bearing 263 is aligned with the base of counterbore 249. Retainer plate 267 is secured with counterbore 249 so as to prevent axial movement of cylinder 261. Bevel gear 269 is fixedly secured to the outer surface of cylinder 261 approximately midway between the inner surface of lower side 233 and the longitudinal center of cylinder 261 such that the teeth of bevel gear 269 face generally upwardly toward upper side 231. Rod 271 has threaded portion 279 threadingly received within passage 277 of cylinder 261, unthreaded portion 281 extending from the lower end of threaded portion 279 and clevis eyelet 283, having pin passage 285, extending from the lower end of unthreaded portion 281. The lowermost end of rod 271 extends through passage 253 such that clevis eyelet 283 is positioned below the lower surface of lower side 233.

Plunger mechanism 219 includes plunger cylinder 287, annular bearings 289, 291, retainer plate 293, annular bevel gear 295 and plunger rod 297. Cylinder 287 has bearing seats 299, 301 at either end and threaded passage 303, preferably having 32 threads per inch (right-hand threads), extending axially therethrough. Cylinder 287 is rotatably mounted parallel to cylinder 261 between and coaxial to passages 247, 255. Cylinder 287 is held in position by bearing 289, which bears between passage 247 and bearing seat 299, and bearing 291, which bears between counterbore 259 of passage 255 and bearing seat 301. The upper surface of bearing 289 is aligned with the base of counterbore 251. Retainer plate 293 is secured within counterbore 251 so as to prevent axial movement of cylinder 287. Bevel gear 295 is fixedly secured to the outer surface of cylinder 287 approximately midway between the inner surface of upper side 231 and the longitudinal center of cylinder 287 such that the teeth of bevel gear 295 face generally downwardly toward lower side 233. Rod 297 has threaded portion 305 threadingly received within passage 303 of cylinder 287, unthreaded portion 307 extending from the lower end of threaded portion 305 and clevis eyelet 309, having pin passage 311, extending from the lower of unthreaded portion 307. The lowermost end of rod 297 extends through passage 255 such that clevis eyelet 309 is positioned below the lower surface of lower side 233.

Motor unit 221 is a system for rotating cylinder 261 in response to a first electrical input signal, the direction of rotation of cylinder 261 being dependent on the polarity of the first electrical input signal, and for rotating cylinder 287 in response to a second electrical input signal, the direction of rotation of cylinder 287 being dependent on the polarity of the second electrical input signal.

In accordance with this desired function, motor unit 221 preferably includes motor/drive unit 313 having cylindrical body 315, input terminals 317, 319 extending from one end of body 315 and output shaft 321 extending coaxially from the other end of body 315; and motor/drive unit 323 having cylindrical body 325, input terminals 327, 329 extending from one end of body 325 and output shaft 331 extending coaxially from the other end of body 325. Motor/drive unit bodies 315, 325 house a dc-actuated electric motor having a motor shaft that rotates in response to an electrical signal applied across the input terminals extending from the body, the direction of rotation of the motor shaft depending directly on the polarity of the signal applied, and the speed of rotation depending on the magnitude of the signal applied. Bodies 315, 325 each may further include reduction gearing connecting the motor shaft to the output shaft such that the output shaft rotates substantially slower than the motor shaft. A motor/drive unit of the preferred type is manufactured by Micromo Electronics, Inc., Cleveland, Ohio and sold as Motor No. 330409 with gear box 03/2-975-1.

Figure 6:
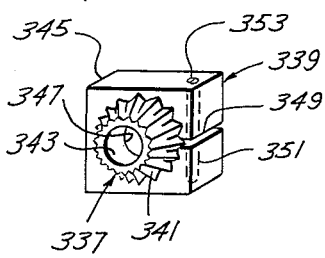
FIG. 6 is a detailed pictorial view of the bevel gear unit of a motor unit of the rear support mechanism of the preferred embodiment of the apparatus of the invention.

Motor unit 221 further includes bevel gear units 333, 335 mounted on shafts 321, 331, respectively, for transmitting torque from output shafts 321, 331, respectively, to gears 269, 295, respectively. Preferably, each of units 333, 335 includes a clutch mechanism for limiting the transmitted torque in order to protect the motor/drive units and/or the threads of the plunger cylinders and rods from damage should jamming occur. In accordance with this object, as shown in FIG. 6, units 333, 335 each include bevel gear 337 securely attached to clutch 339. Gear 337 has teeth 341 designed to mesh with either gear 269 or gear 295, the ratio of number of teeth of gear 337 to number of teeth of gears 269, 295 being 4-to-1. Gear 337 also has shaft passage 343 having a diameter slightly greater than that of output shafts 321, 331 so that shafts 321,331 can rotate without rotating gear 337 of the respective bevel gear unit. Clutch 339 includes nylon block 345 having shaft passage 347 coaxial with passage 343 and having a diameter slightly less than output shafts 321, 331. Block 345 has split 349 extending radially from passage 347 through the entire thickness of block 345. By virtue of split 349, block 345 can be mounted on one of shafts 321, 331 merely by spreading split 349 so as to open passage 347. Block 345 further has threaded passage 351 perpendicularly intersecting split 349 near the outer periphery of block 345 and opening on one side of block 345. Clutch 339 further includes screw 353 threaded into passage 351 such that screw 353 engages passage 351 on either side of split 349. In accordance with this description, it can be seen that by adjusting screw 353, the tendency of a bevel gear unit to slip with respect to the output shaft on which it is mounted can be adjusted. Preferably, screw 353 should be adjusted such that the bevel gear unit tends to slip when a torque of 45 pounds is applied between the unit and the output shaft on which the unit is mounted.

Motor unit 221 also includes support posts 355, 357 for supporting motor/drive units 313, 323 such that the axes of output shafts 321, 331 are perpendicular to the plunger cylinders and such that the gear of gear unit 333 meshes with gear 269 and the gear of gear unit 335 meshes with gear 295. In accordance with this function, posts 355, 357 are secured to and extend perpendicularly from the upper surface of lower side 233 of housing unit 215. Post 355 has circular mounting holes 359, 361 and post 357 has circular mounting holes 363, 365 coaxial with holes 359, 361, respectively. Body 315 of motor/drive unit 323 is mounted in holes 359, 363. Holes 359, 361, 363, 365 may be split and posts 355, 357 may include screw means for tightening the split so as to secure motor/drive units 313, 323 with respect to posts 355, 357.

Motor unit 221 further includes terminal units 367, 369 mounted at the top of post 357. Terminal units 367, 369 are for the purpose of providing electrical access to the terminals of motor/drive units 313, 323, respectively. Terminal unit 367 includes terminals posts 371, 373 connected by wires to terminals 327, 329, respectively, of motor/drive unit 323. Terminal unit 369 includes terminal posts 379, 381 connected by wires to terminals 317, 319, respectively, of motor/drive unit 313.

In accordance with the foregoing description of plunger mechanisms 217, 219 and motor unit 221, when a direct current potential is applied between posts 371 and 373 of terminal unit 367, output shaft 331 of motor/drive unit 323 rotates causing cylinder 287 to rotate. For the purposes of this description, it will be understood that when the potential at post 371 is positive with respect to that at post 373 ("positive potential"), output shaft 331 rotates counter-clockwise (viewing shaft 331 from the left in FIG. 5) causing cylinder 287 to rotate clockwise (viewing cylinder 287 from the top in FIG. 5). Thus, when the potential at post 371 is negative with respect to that at post 373 ("negative potential"), output shaft 331 will rotate clockwise and cylinder 287 will rotate counterclockwise. Similarly, when a direct current potential is applied between posts 379, 381 of terminal unit 369, output shaft 321 of motor/drive unit 313 rotates causing cylinder 261 to rotate. For the purposes of this description, it will be understood that when the potential of post 381 is positive with respect to that at post 379 ("positive potential"), output shaft 321 rotates counterclockwise (viewing shaft 321 from the left in FIG. 5) causing cylinder 261 to rotate clockwise (viewing cylinder 261 from the top in FIG. 5). Thus, when the potential of post 381 is negative with respect to that at post 379 ("negative potential"), output shaft 321 will rotate clockwise and cylinder 261 will rotate counterclockwise.

Base unit 223 includes block 387, control shaft 389, guide shaft 391, control clevis 393, guide clevis 395 and feet 397, 399.

Block 387 has the general configuration of an elongate right rectangular hexahedron and has upper side 401, lower side 403, left side 405, right side, 407, front side 409 and rear side 411. Block 387 further includes rectangular cross section channels 413, 415 of equal length opening at upper side 401 and separated at the center of block 387 by rib 417. Block 387 also has shaft passage 419 extending perpendicular to left side 405 from left side 405 to channel 413 and shaft passage 421 extending coaxial to passage 419 from right side 407 to channel 415. Block 387 additionally includes blind holes 423, 425 extending into rib 417 adjacent channels 413, 415, respectively, coaxial to passages 419, 421.

Control shaft 389 includes shaft portion 427 and knob 428. Shaft 389 is rotatably secured within block 387 such that shaft portion 427 extends through passage 419 and into blind hole 423 and knob 428 is positioned adjacent, but not touching, left side 405. The length of shaft portion 427 extending through channel 413 is right-hand threaded, preferably 20 threads per inch.

Guide shaft 391 is secured within block 387 such that it extends through passage 421 and into blind hole 425.

Control clevis 393 connects between clevis eyelet 283 of plunger mechanism 217 and the threaded portion of control shaft 389. Thus control clevis 393 includes clevis yoke portion 431 for connecting to clevis eyelet 283 and clevis eyelet portion 433 for connecting to control shaft 389. Yoke portion 431 includes arms positioned on either side of eyelet 283 and passages aligned with pin passage 285 of eyelet 283. Control clevis 393 further includes pin 443 secured within the passages of yoke portion 431 and passage 285 such that eyelet 283 is rotatable with respect to control clevis 393. Eyelet portion 433 includes threaded passage 445 extending perpendicular to passage 285 and within which the threaded portion of control shaft 389 is threadedly received.

Guide clevis 395 connects between clevis eyelet 309 of plunger mechanism 219 and guide shaft 391 and includes clevis yoke portion 447 and clevis eyelet portion 449. Yoke portion 447 includes arms positioned on either side of eyelet 309 and passages aligned with pin passage 311 of eyelet 309. Guide clevis 395 further includes pin 459 secured within the passages of yoke portion 447 and passage 311 such that eyelet 309 is rotatable with respect to guide clevis 395. Eyelet portion 449 includes passage 461 extending perpendicular to passages 455, 311, 457 and within which the portion of guide shaft 391 extending through channel 415 is telescopically received. The respective diameters of shaft 391 and passage 461 should be such that clevis 395 slides freely over shaft 391 without substantial play.

Feet 397, 399 have pointed ends 463, 465, respectively, and are fixedly attached to opposite ends of the lower surface of lower side 403 of block 387 such that ends 463, 465 extend an equal distance perpendicularly away from the lower surface of lower side 403.

In operating the support mechanism of the apparatus, the support mechanism is positioned with respect to a substantially planar fixedly oriented support surface such that the pointed ends of feet 199, 201, 397, 399 contact the support surface whereby housing 11 is supported above the support surface. Lower pivot block 171 of front support unit 161 is oriented such that its axis is substantially parallel to the axis of block 387 of base unit 223 of rear support unit 163 by rotating block 171 on pivot pin 165. With housing 11 supported by the support mechanism in such a manner, the direction and slope of axes E and F can be varied without moving the feet with respect to the support surface, the direction of an axis being defined as the orientation of the horizontal component of the axis and the slope of an axis being defined as the degree of deviation of the axis from the horizontal. For purposes of this description, the slope of axis E ("SE") is positive when axis E is inclined upwardly moving from left wall 17 to right wall 19 of housing 11 and negative when axis E is inclined downwardly moving from left wall 17 to right wall 19; and the slope of axis F ("SF") is positive when axis F is inclined upwardly moving from the rear to the front of housing 11 and negative when axis F is inclined downwardly moving from the rear to the front of housing 11.

Thus, when knob 428 of control shaft 389 is rotated, control clevis 393 moves axially along shaft portion 427 of control shaft 389 by action of the threads of control shaft 389 and threaded passage 445 of control clevis 393. Such movement of control clevis 393 will force the rear of housing 11, which is connected to clevis 393 through plunger rod 271, cylinder 261 and housing unit 215, to move in a direction parallel to the axis of base unit 223 of rear support unit 163 while guide clevis 395 slides along guide shaft 391 and the front end of housing 11 rotates on pivot pin 165. As a result, axes E and F will rotate generally about axis C whereby the direction of the horizontal components of axes E and F will vary. More specifically, when knob 428 is rotated clockwise (viewing knob 428 from the left in FIG. 5), axes E and F will rotate counterclockwise about axis C (viewing axis C from above housing 11) and when knob 428 is rotated counterclockwise, axes E and F will rotate clockwise about axis C.

The slopes of axes E and F are varied by applying an electrical potential to either or both of terminal units 367, 369. As described supra, application of electrical potential to terminal units 367, 369 causes cylinders 287, 261, respectively, to rotate, the direction of rotation of cylinders 287, 261 being dependent on the polarity of the potential at units 367, 369, respectively. The connection of plunger rods 271, 297 to base unit 223, however, prevents rotation of plunger rods 271, 297 about their respective axes. As a result, rotation of cylinders 261, 287 will cause plunger rods 271, 297 to move into and out of cylinders 261, 287, respectively. Such movement of plunger rods 271, 297 will cause housing 11 to move with respect to base unit 223, and because the position of base unit 223 is largely fixed with respect to the support surface, will cause the orientation of housing 11 to vary with respect to the support surface as housing 11 rotates on feet 199, 201 and/or pivot pin 167 of front support unit 161. Furthermore, because the support surface is fixed with respect to the horizontal, rotation of either or both of cylinders 261, 287 will cause either or both SE and SF to vary. The general relationship of the potentials applied at terminal units 367, 369 to changes in SE and SF are set forth in Table 1 in which "P369" is the polarity of the potential at unit 369; "P367" is the polarity of the potential at unit 367; "0" is no potential (0 volts); "+" is positive potential; "−" is negative potential; "R" is the relationship of the magnitude of the potential at unit 369 to the magnitude of the potential at unit 367; "X" indicates that the polarities themselves govern the relationship; "=" indicates that the magnitude of the potential at unit 369 is equal to that at unit 367; " " indicates that the magnitude of the potential at unit 369 is greater than that at unit 367; " " indicates that the magnitude of the potential at unit 369 is less than that at unit 367; "NC" indicates no change in slope; "decrease" indicates decreasing slope; and "increase" indicates increasing slope.

TABLE 1

| P369 | P367 | R | SE | SF |
|------|------|---|----|----|
| 0 | 0 | X | NC | NC |
| 0 | + | X | decrease | increase |
| 0 | − | X | increase | decrease |
| + | 0 | X | increase | increase |
| + | + | = | NC | increase |
| + | + |   | decrease | increase |
| + | + |   | increase | increase |
| + | − | = | increase | NC |
| + | − |   | increase | increase |
| + | − |   | increase | decrease |
| − | 0 | X | decrease | decrease |
| − | + | = | decrease | NC |
| − | + |   | decrease | decrease |
| − | + |   | decrease | increase |
| − | − | = | NC | decrease |
| − | − |   | decrease | decrease |
| − | − |   | increase | decrease |

It should be noted that Table 1 is based on the assumption that each motor/drive unit-plunger mechanism combination have identical electrical input versus mechanical output characteristics and that the rate of movement of a plunger rod into and out of a cylinder is linearly dependent on the magnitude of the potential applied to the respective terminal units. Because this assumption can only be approximately fulfilled in most instances, Table 1 is accurate only as a general guide for understanding the operation of the rear support mechanism.

4. Optical Bench

Referring to FIGS. 2 and 3, the preferred embodiment of the apparatus of the invention includes optical bench 511 for supporting various of the components of the apparatus. Bench 511 is a flat piece of material, preferably 0.25 inch (0.635 cm.) thick sheet aluminum, supported parallel to and slightly above bottom plate 15 of housing 11 by cylindrical, tubular spacers 512 disposed between the upper surface of bottom 15 and the lower surface of bench 511 such that the upper surface of bench 511 is distance F1 below axis F. Bench 511 is secured to bottom 15 by screws 513 extending through bottom 15 and spacers 512 and threaded into bench 511. Preferably, bench 511 has a geometrical configuration substantially similar to, but with slightly smaller dimensions than, bottom 15 such that the outer periphery of bench 511 corresponds with the inner walls of housing 11.

5. Light Source and Optics

Optical bench 511 further supports a source of a coherent light beam of low divergence, which, in the preferred embodiment, includes laser tube 531, having power input terminals 532, 534, and directional and imaging optics system 533. Tube 531 may be any one of a variety of commercially-available laser-beam generating tubes. Such a tube preferably provides a beam from beam output 539 of sufficient coherence and intensity to be used to activate a photosensitive device, as discussed infra, in sunlight at a distance of 1500 feet. A tube especially well-adapted for the purposes of this invention is Coherent Radiation, Mountainview, Calif., Model No. 80-T5 laser tube.

As shown in FIGS. 2 and 3, tube 531 is disposed above optical bench 511 and secured thereto by supports 535, 537 such that the axis of laser tube 531 is parallel to axis F and is spaced the distance F1 above the upper surface of bench 511.

In the preferred embodiment, directional and imaging optics 533 direct the beam generated by tube 531 at beam output 539 toward axis F and then along axis F toward passage 114 of front wall 21. Thus, optics 533 include (1) plane reflector 541 positioned between beam output 539 and front wall 21 of housing 11 and having a reflective surface in a plane perpendicular to bench 511 and angled 45° to axis F so as to reflect the beam produced by tube 531 an angle of 90° and toward axis F; and (2) plane reflector 542 positioned between reflector 541 and left wall 17 and along axis F, plane reflector 542 having a reflective surface in a plane perpendicular to bench 511 and angled 45° to axis F so as to reflect the beam reflected by reflector 541 along axis F and toward passage 114.

It has been found that proper positioning of reflectors 541, 542 is most easily achieved when the reflectors are mounted on support degvice 543. Device 543 comprises a block of material such as aluminum secured to bench 511 and machined to form parallel plane surfaces 543A, 543B, respectively. Surfaces 543A, 543B are in planes that are perpendicular to bench 511 and angled at 45 degrees to axis F. Surface 543A intersects the axis of tube 531 at a point AA spaced slightly in front of output 539 of tube 531. Surface 543B intersects axis F a distance equal to the thickness of reflector 542 behind, i.e., spaced away from front wall 21, the intersection of (1) axis F and (2) line BB which perpendicularly intersects the axis of tube 531 at point AA and axis F. Device 543 further includes circular cross-section passage 543C having an axis coincident with line BB. Device 543 also has passage 543D having an axis coincident with that of tube 531, such axis perpendicularly intersecting the axis of passage 543C at the plane of surface 543A. Reflector 541 is secured to plane surface 543A such that the reflective surface of reflector 541 faces toward surface 543A and intersects passages 543C, 543D. Reflector 542 is secured to plane surface 543B such that the reflective surface of reflector 542 faces away from surface 543B and intersects the axis of passage 543C at axis F. In accordance with this mounting method, it can be seen that a beam generated by tube 531 will be directed along the axis of passage 543D to the reflective surface of reflector 541. The beam will then be reflected through an angle of 90 degrees along the axis of passage 543C toward the reflective surface of reflector 542. Reflector 542 will then reflect the beam along axis F toward passage 114.

Furthermore, in the preferred embodiment, optics 533 include concave lens 545 and convex lens 547 for focusing the beam generated by tube 531 and reflected by device 543 into a beam of low-divergence, i.e., a beam that has substantially parallel rays. The beam produced should also have a cross-sectional area that corresponds to the intensity of the beam produced by tube 531 in such a way that the beam produces a visible and definable image at large distance, preferably at distances greater than 1500 feet. In the preferred embodiment of optics 533, lens 545 is a −14.00 concave lens and lens 547 is a +3.80 convex lens. As shown in FIG. 3, lens 545 and lens 547 are mounted in passage 548A of cylindrical tube 548B such that the focal axes of each lens is coincident with the axis of tube 548B. Tube 548B is mounted on a lens support 548C, which is secured to bench 511, such that the axis of tube 548B is coincident with axis F.

Optical bench 511 also supports beamsplitting device 549 for splitting the beam directed from lens 547 ("principal beam") into a first beam extending in a direction perpendicular to the source beam and a second beam extending in the same direction as the principal beam, i.e., extending along axis F and through passage 114. Preferably, beamsplitting device 549 is capable of selectively and discretely varying the direction of the first beam to any of three particular directions without substantially altering the direction of the second beam and while maintaining the perpendicular relationship of the first and second beam directions. The three particular directions are (1) along axis E and through passage 67 of left wall 17 ("left"); (2) along axis E and through passage 107 of right wall 19 ("right"); and (3) along axis C and through passage 31 of top 13 ("up").

Thus, beamsplitting device 549 includes an optical component for splitting the principal beam into a first and a second beam having a perpendicular relationship to one another, such component being capable of maintaining such relationships even when the component is adjusted to redirect the first beam; and a support component for adjustably supporting the optical component such that the optical component can be quickly and accurately repositioned to direct the first beam in any of the three particular directions described supra.

Figure 7:
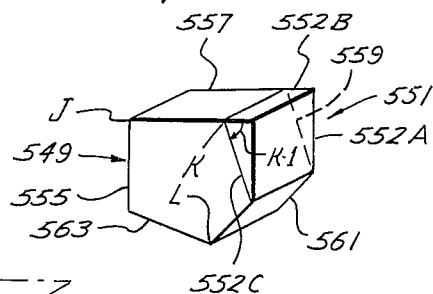
FIG. 7 is a detailed view of the optical component of the preferred embodiment of the apparatus of the invention.

As shown in FIG. 3, the optical component of beamsplitter 549 comprises internal transmittal pentaprism 551 and wedge 552. Pentaprism 551, as shown in FIG. 7, is a right five-sided prism having surfaces 555, 557, 559, 561 and 563. Surfaces 555, 557 are fully light-transmittive and form a 90° angle at J. Surfaces 557, 559 and surface 555, 563 form 112° 30′ angles at K, L, respectively. Surface 559 is half silvered such that light transmitted through surface 555 and internally incident on surface 559 is partially reflected and partially transmitted by surface 559. Surface 563 is fully silvered such that light reflected by surface 559 and internally incident on surface 563 is reflected by surface 563 toward surface 557. Such a pentaprism is commercially available from Optical Industries. Wedge 552 is a three-sided glass prism having surfaces 552A, 552B, 552C all being fully light-transmittive. Surface 552A is perpendicular to surface 552B. Surface 552C forms an angle K1 of 67° 30′ with surface 552B. Wedge 552 is secured to pentaprism 552 by transparent cement such that surface 552C of wedge 552 juxtaposes surface 559 of pentaprism 551 whereby surface 552A of wedge 552 and surface 555 of pentaprism 551 will be parallel to one another.

The characteristic of such an optical component is that a beam of light incident on surface 555 of pentaprism 551 will be partially transmitted through the component without substantial deviation and will be partially deviated through an angle of 90°, the angle of deviation being constant regardless of the angle of incidence of the beam on surface 555. Thus, the beam incident on surface 555 is split into a deviated beam, which emerges from surface 557 of pentaprism 551, and a relatively undeviated beam, which emerges from surface 552A of wedge 552, the deviated beam and undeviated beam being perpendicular to one another regardless of the angle of incidence of the beam on surface 555.

The actual direction of the deviated beam will depend on the direction surface 557 faces.

The support component of beam-splitting device 549 supports the optical component along axis F so that the principal beam is incident on surface 555 and so that pentaprism 551 can be rotated about an axis substantially perpendicular to and intersecting surface 555 whereby the direction surface 557 faces is variable. In the preferred embodiment, the support component includes prism unit 565 in which pentaprism 551 and wedge 552 are retained, support posts 567, 569 for supporting prism unit 565 along axis F, knob structure 571 for rotating prism unit 565 and locking mechanism 573 for locking the position of prism unit 565 in particular discrete positions.

Prism unit 565 includes housing 575 having flat side plates 575A, 575B, 575C and flat end plates 575D, 575E rigidly secured together to form chamber 576. Housing 575 is open along the area opposite side 575B. End plates 575D, 575E have coaxial circular openings 577, 579, respectively, therethrough. Pentaprism 551 and wedge 552 are secured within chamber 576 using RTV adhesive such that surface 555 faces toward end plate 575D and is substantially perpendicular to the axis of openings 577, 579 and surface 557 faces away from plate 575B. Housing 575 may further include transparent coverplate 583 which is removably secured by screws over the open area of chamber 576.

Prism unit 565 further includes annular rings 591, 593 secured to the outer surface of end plates 575D, 575E, respectively, such that they are coaxial with openings 577, 579. It is noted at this point that locking mechanism 573 includes generally annular locking ring 595 secured to the surface of ring 591 facing away from housing 575. Locking ring 595 includes detent portion 597 and bearing portion 599. Detent portion 597 will be discussed in greater detail infra in connection with the remainder of locking mechanism 573. Support posts 567, 569 support prism unit 565 and locking ring 595 above bench 511 such that the axes of openings 577, 579 are coincident with axis F with end plate 575D facing toward lens 547 and such that pentaprism 551 is centered at point G. In the preferred embodiment, post 567 has circular passage 601 therethrough coaxial with axis F and having counterbore 603 for rotatably receiving bearing portion 599 of locking ring 595. Post 569 has circular passage 605 therethrough coaxial with axis F and having counterbore 607 for rotatably receiving ring 593 of prism unit 565.

Knob structure 571 includes elongate circular tube 608 having axial passage 608A therethrough, and knob 609 having passage 609A therethrough. End 608B of tube 608 extends through passage 605 and is secured to ring 593 such that tube 608 is coaxial with axis F. End 608C of tube 608 extends through passage 115 of front 21. Knob 609 is secured to end 608C of tube 608 outside housing 11 such that passage 609A is coaxial with passage 608A.

In accordance with this arrangement of pentaprism 551, prism unit 565, support posts 567, 569 and knob structure 571, a beam emerging from lens 547 is directed through post 567, locking ring 595, ring 591 and opening 577 into chamber 576 and is incident on surface 555 of pentaprism 551. Pentaprism 551 then splits the principal beam into a first beam ("deviated beam") that is perpendicular to the principal beam and a second beam ("undeviated beam") whose direction is substantially the same as that of the principal beam. The first beam emerges from surface 557 and is directed through transparent coverplate 583 and the second beam emerges from surface 559 of pentaprism 551, and is directed through opening 579, through the entire length of tube 608 and emerges from passage 609A of knob 609. By rotating knob 609, the first beam sweeps through a plane perpendicular to the second beam. The position of pentaprism 551 with respect to point G should be adjusted so that the plane through which the first beam sweeps is coincident with the plane formed by axes C and E.

Locking mechanism 573 is a ball-type detent latch mechanism and includes ball portion 611 and locking ring 595, locking ring 595 having been described in part supra. Ball portion 611 includes ball support 612 extending perpendicularly from support post 567 and over detent portion 597 of locking ring 595. Post 567 and ball support 612 may be an integral unit. No part of ball support 612 should extend over the optical component. The shortest distance from axis F to the lower surface of ball support 612 ("distance X") should be substantially less than F1.

Referring to FIGS. 3 and 4, ball support 612 has detent latch passage 613 extending therethrough and having an axis that is perpendicular to bench 511 and passes through the axial center of detent portion 597 of locking ring 595. The lower end of detent latch passage 613 has a slightly reduced inside diameter so as to form shoulder 615 facing into latch passage 613. The upper end of passage 613 opposite shoulder 615 is threaded. Ball support 612 also includes passages 614, 616 extending therethrough. Passages 614, 616 are parallel to passage 613 and are equally spaced to either side of passage 613 a distance ("distance Z") greater than distance X and less than F1. The axis of passages 613, 614, 616 should all be in the same plane, such plane being perpendicular to axis F. Passages 614, 616 are threaded through their entire length. Ball support 612 further includes set screws 618, 620 threaded into passages 614, 616, respectively. Screws 618, 620 should have sufficient length to extend from their respective passages a distance greater than distance X and should be preset to extend from their respective passages a distance approximately equal to distance X.

Ball portion 611 further includes detent ball 619 having a diameter less than the inner diameter of passage 613 and a diameter slightly greater than shoulder 615 whereby ball 619 can freely rest on shoulder 615 with a substantial portion of ball 619 extending from the lower end of passage 613 and toward detent portion 597 of locking ring 595. Ball portion 611 also includes compression spring 621 having diameter less than ball 619 and disposed in passage 613 and resting on ball 619 such that one end of spring 621 extends beyond the threaded portion of passage 613 when relaxed. Ball portion 611 further includes set screw 623 for engaging the threads in passage 613 such that screw 623 will compress spring 621 as it is threaded into passage 613. Such compression provides a downward force against ball 619. The resultant force should be great enough to hold ball 619 securely against shoulder 615 when no external upward force is applied against ball 619, but not so great as to prevent upward movement of ball 619. In this way, ball 619 will serve as the latch of a ball-type detent latch mechanism.

Figure 8:
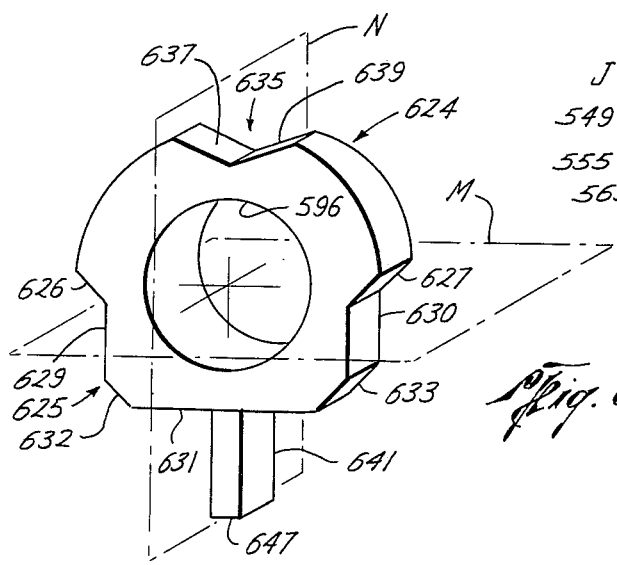
FIG. 8 is a detailed pictorial view of the detent portion of the locking ring of the preferred embodiment of the apparatus of the invention.
Figure 3B:
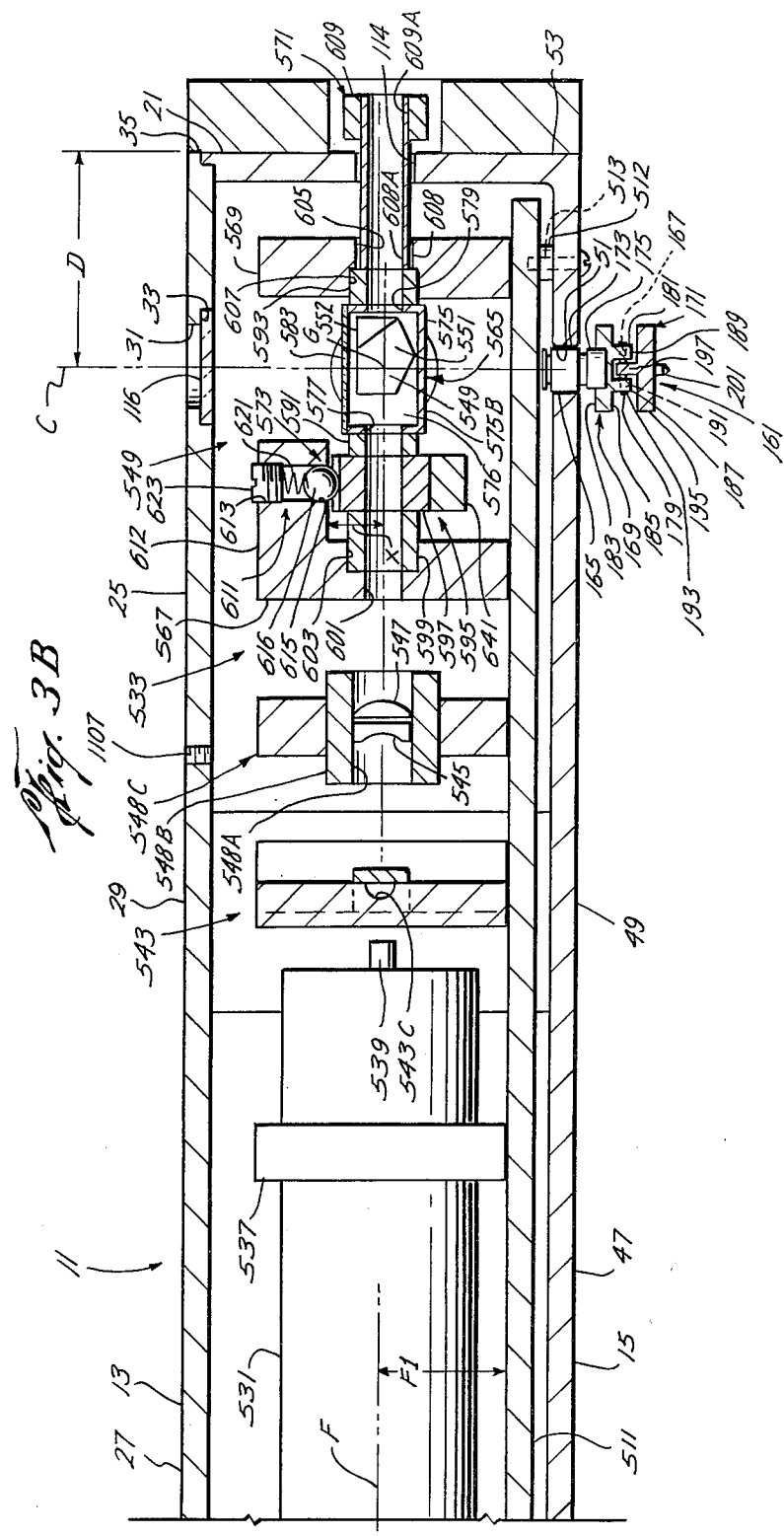

Detent portion 597 of locking ring 595 serves as a multiple catch of a ball-type detent latch mechanism, the catches to cooperate with ball 619. As shown in FIGS. 4 and 8, the preferred embodiment of detent portion 597 is an annulus having an irregular outer periphery with passage 596 at the center. In order to facilitate the description of detent portion 597, FIG. 8 includes reference planes M and N perpendicularly intersecting one another along the axis of passage 596. Planes M and N are for reference purposes only and do not constitute part of the apparatus. Thus, the outer periphery of detent portion 597 includes first portion 624 disposed above plane M and extending symmetrically to either side of plane N; second portion 625 disposed below plane M and extending symmetrically to either side of plane N; intermediate portion 626 joining first portion 624 to second portion 625 on one side of plane N; and intermediate portion 627 joining first portion 624 to second portion 625 on the other side of plane N.

First portion 624 has a generally cylindrical configuration with center at the axis of passage 596 and radius slightly less than distance X such that when first portion 624 faces toward ball 619, ball 619 is forced away from shoulder 615 and into passage 613. Second portion 625 includes plane surfaces 629, 630 extending parallel to plane N and spaced to either side of plane N a distance substantially less than the radius of first portion 624; and plane surface 631 extending parallel to plane M a distance substantially less than distance Z such that as locking ring 595 is rotated about axis F, surfaces 629, 630, 631 do not contact screws 618, 620. The intersection of surfaces 629, 631 and of surfaces 630, 631 may be rounded so as to form surfaces 632, 633, respectively. Intermediate portions 626, 627 are plane surfaces obliquely intersecting plane M such that the portion below plane M is closer to plane N than is the portion above plane N.

The preferred embodiment of detent portion 597 further includes detent catch groove 635 cut into first portion 624 and having flat surfaces 637, 639 intersecting at plane N and extending symmetrically from plane N. Groove 635 should be wide enough at first portion 624 to permit ball 619, under force of spring 621, to move into groove 635 when groove 635 is positioned adjacent ball 619 so as to releasably lock locking ring 595 into position with respect to axis F.

Locking ring 595 further includes detent stop bar 641 extending perpendicularly from surface 631 of second portion of the outer periphery of detent portion 597 along plane N. Stop bar 641 may be secured to detent portion 597 by a screw extending through stop bar 641 and threaded into detent portion 597. Bar 641 has tip 647 that is less than distance F1 but greater than distance Z from axis F.

According to the operation of locking ring 595, application of torque to locking ring 595 by way of knob 609 so that groove 635 is rotated away from ball 619 will cause ball 619 to contact one of the intermediate portions 626, 627 of the outer periphery of detent portion 597. Thus, viewing locking ring 595 in the direction of FIG. 4, clockwise rotation of locking ring 595 will cause ball 619 to contact intermediate portion 626. The interaction of ball 619 and intermediate portion 626, caused by the force of spring 621 and the slope of portion 626, will result in a clockwise torque on ring 595 even when external torque applied through knob 609 is released and ring 595 will continue to move in a clockwise direction. The length of intermediate portion 626 should be great enough that such movement will continue until bar 641 comes into contact with set screw 618, such contact precluding further clockwise movement of ring 595 and releasably securing ring 595 into position. Ring 595 may be released from this locked position by applying an external counterclockwise torque to ring 595 through knob 609 so as to force ball 619 outwardly and onto first portion 624 of the outer periphery of detent portion 597.

Similarly, by rotating ring 595 counterclockwise until bar 641 contacts set screw 620, ring 595 will releasably lock in a position with ball 619 in contact with intermediate portion 627.

Thus, ring 595 of the preferred embodiment can be set in three discrete positions: an extreme clockwise position; an extreme counterclockwise position; and a central position. Ring 595 should be secured to prism unit 565 such that when locking ring 595 is locked in its central position, the first beam will be directed from pentaprism 551 along axis C and through passage 31 of top 13. The extreme positions can then be set by adjusting set screws 618, 620 so that when locking ring 595 is locked in such positions, the first beam will be directed along axis E in either direction.

6. Level Control Mechanism

Bench 511 further supports a level control mechanism which controls the orientational relationship of housing 11 to the support surface by applying varying potential to terminal units 367, 369 of the support mechanism. The level control mechanism includes level actuators 655, 657, actuator drive and indication devices 659, 661, and level control circuitry 663 mounted on circuit board 664. Each level actuator includes (1) a transducer having an axis, the transducer providing an output of electrical significance that varies according to the slope of the axis with respect to the horizontal and (2) support means for supporting the transducer on bench 511 such that the slope of the axis of the transducer with respect to bench 511 can be varied. Each actuator drive and indication device includes (1) means for driving the support means of one of the level actuators so as to cause such actuators to vary the slope of the axis of its transducer with respect to bench 511 and (2) indicator means for indicating the slope of the axis of the transducer of the actuators with respect to bench 511. Circuitry 663 applies potential to terminal units 367, 369, the potential applied being dependent on the slope of the axes of the level actuator transducers with respect to the horizontal.

Referring to FIGS. 9-11, level actuator 655 includes support mechanism 666 and transducer 668. Support mechanism 666 includes base unit 665, transducer support unit 667 and slope adjust mechanism 669.

Base unit 665 includes flat, rectangular platform 671 and mechanism housing 673. Platform 671 has an axis R and has parallel upper and lower surfaces 674, 676, respectively, ends 675, 677 and sides 679, 681. Platform 671 is secured to the rear of bench 511 such that lower surface 676 of platform 671 rests on the upper surface of bench 511. Platform 671 is positioned between tube 531 of optics system 533 and the rear of bench 511 with axis R oriented substantially parallel to axis E.

Housing 673 includes sidewall 683 adjoining end 677 of platform 671 and extending perpendicularly therefrom; sidewall 685 disposed parallel to sidewall 683 and extending from platform 671 along a line spaced toward the center of platform 671 from end 677; and top 687 extending between sidewalls 683, 685 and disposed parallel to platform 671. Top 687 has circular aperture 689 therethrough, the axis of aperture 689 being spaced approximately ¼ of the distance from side 679 to side 681 of platform 671 and a distance S from sidewall 685. Housing 673 further includes end plates 691, 693 removably secured to sidewalls 683, 685 and top 687 adjacent sides 679, 681, respectively, of platform 671. End plates 691, 693 have coaxial circular apertures 695, 696, respectively, therethrough, which are coaxial when plates 691, 693 are secured as noted, the axis of apertures 695, 696 being perpendicular to axis R and being spaced a distance T, which is greater than distance S, from sidewall 685. The actual difference between distances S and T will correspond to the design of mechanism 669, discussed infra.

Base unit 665 further includes support post 697 extending perpendicularly from platform 671 adjacent end 675 and positioned such that a line in a plane parallel to bench 511 and connecting the axis of post 697 and the axis of aperture 689 is parallel to axis R. Post 697 has unthreaded circular cross-section passage 698 (see FIG. 2A) extending therethrough, the axis of passage 698 extending perpendicular to axis R of spaced distance V (not shown) from upper surface 674 of platform 671. Distance V is substantially greater than the distance top 687 of housing 673 is spaced from platform 671.

Adjust mechanism 669 includes worm shaft 699, worm gear 701, sprocket 703 (see FIG. 3A), spur gear 705, spur shaft 707, and connector block 709. Worm shaft 699 is rotatably secured in apertures 695, 696 such that end 710 of shaft 699 extends outside of housing of 673 and such that axial movement of shaft 699 is prevented. Sprocket 703 is fixedly attached to end 710 of shaft 699. Worm gear 701 is fixedly secured to shaft 699 adjacent the axis of aperture 689 of top 687. Spur shaft 707 is rotatably secured in aperture 689 such that axial movement of shaft 707 is prevented and such that the axis of shaft 707 is perpendicular to bench 511. Spur gear 705 is fixedly secured to the end of spur shaft 707 inside housing 673 so as to mesh with worm gear 701. The end of spur shaft 707 outside housing 673 is threaded (righthanded).

In accordance with the description of mechanism 669 described thus far, rotation of sprocket 703 will cause spur shaft 707 to rotate. The relation of the directions of rotation depends on the direction of the helix of worm gear 701. For purposes of understanding the overall operation of the grade control mechanism, it will be understood that worm gear 701 is right-handed whereby clockwise rotation of sprocket 703 (viewing sprocket 103 from the right of of FIG. 10) will result in counterclockwise rotation of spur shaft 707 (viewing spur shaft 707 from the top of FIG. 10) and counterclockwise rotation of sprocket 703 will result in clockwise rotation of spur shaft 707.

Connector block 709 has parallel sides 711, 713, threaded passage 715 and unthreaded passage 717. The axis of threaded passage 715 is midway between sides 711, 713. Passage 717 extends perpendicular to passage 715 from side 711 to side 713. Passage 717 does not intersect passage 715. The threaded end of spur shaft 707 is threaded into passage 715 such that passage 717 can be positioned distance V above upper surface 674 of platform 671. The length of shaft 707, the length of the threaded portion of shaft 707 and the depth of threaded passage 715 should be such that when passage 717 is positioned distance V above platform 671, shaft 707 can be threaded both into and out of passage 715 a substantial amount without either tightening the connection of block 709 to shaft 707 or breaking the connection of block 709 to shaft 707.

Transducer support unit 667 includes block 723, with platform 725 extending therefrom (see FIG. 3A), and clevis yoke 727. Block 723 has notch 729 (see FIG. 2A) at one end defining parallel arms 731, 733. Arms 731, 733 have coaxial pin passages 735, 737, respectively, therethrough. Notch 729 is disposed adjacent post 697 such that arms 731, 733 are positioned on either side of post 697 and passages 735, 735 are aligned with passage 698 of post 697 whereby the axes of passages 735, 737 are perpendicular to axis R. Block 723 is rotatably secured to post 697 by pivot pin 739 extending through passages 735, 698, 737. Thus, the axis of pivot pin will be perpendicular to axis R.

Clevis yoke 727 is fixedly connected to the end of block 723 opposite notch 729 such that arms 741, 743 of clevis 727 extend perpendicularly away from block 723. Arms 741, 743 include coaxial pin passages 745, 747, respectively, (see FIG. 10) therethrough, the axis of passages 745, 747 being parallel to that of passages 735, 737. Clevis 727 is positioned adjacent block 709 such that arms 741, 743 are positioned adjacent sides 711, 713, respectively, of block 709, and such that passages 745, 747 are aligned with passage 717 of block 709. Clevis 727 is rotatably connected to block 709 by pin 749 extending through passages 745, 717, 747.

Platform 725 has an upper surface 751 which is substantially parallel to the plane including the axes of pins 739, 749.

According to the operation of support mechanism 666 as described, rotation of sprocket 703 will cause support unit 667 to rotate about pin 739. Because the axis of pin 739 is perpendicular to axis R, the axis of rotation of support unit 667 will be perpendicular to axis R. In particular, clockwise rotation of sprocket 703, viewed from the right of FIG. 10, will result in counterclockwise rotation of unit 667, viewed from the top of FIG. 10, about pin 739 and counterclockwise rotation of sprocket 703 will result in clockwise rotation of unit 667. Such rotation will cause the slope of surface 751 to vary with respect to bench 511. The dimensions of the various parts of base unit 665, support unit 667 and mechanism 669 should be such that unit 667 can be rotated 15 degrees of slope (100% equal 90 degrees from horizontal) in either direction form the position wherein surface 751 is parallel to bench 511.

Transducer 668 preferably includes gravity-sensing electrolytic potentiometer 793 mounted in potentiometer casing 795 (see FIG. 11).

Casing 795 includes elongate casing block 797 having a length substantially equal to that of block 723 and width substantially equal to that of platform 725. The height of casing block 797 is substantially less than the distance from the upper surface of platform 725 to the top of block 723. Casing block 797 is positioned adjacent block 723 and spaced above platform 725. Block 797 is secured in this position by hinge 798, preferably comprising a flat, thin piece of stainless steel, attached between one end of block 797 and the end of platform 725 opposite housing 673 such that the axis of casing block 797 is parallel to axis R. Because of the space between the lower surface of casing block 797 and the upper surface of platform 725, casing block 797 can be rotated with respect to support unit 667 by bending hinge 798.

Casing 797 further includes adjustment mechanism 801 (see FIG. 3A) for adjusting the orientation of casing block 797 with respect to support unit 667. Mechanism 801 includes threaded set screw passage 803 extending through the end of casing block 797 opposite that to which hinge 798 is attached, and set screw 805 threaded into passage 803 such that the lower end of screw 805 contacts the upper surface of platform 725. Thus, as set screw 805 is threaded into or out of passage 803, casing block 797 will rotate with respect to support unit 667 on hinge 798.

Casing 795 further includes channel 809 cut into the upper surface of casing block 797. Channel 809 has an axis parallel to the axis of casing block 797. Casing 795 also has terminal passage 810 extending through casing block 797 from the bottom of channel 809 to the lower surface of casing block 797.

In the preferred embodiment, potentiometer 793 is a commercially available device consisting of a sealed, curved glass tube partially filled with a liquid and having three electrodes, two electrodes being arm electrodes and one being a common electrode. Such a potentiometer, shown generally in FIG. 11 as including tube 823, end electrode terminals 825, 827 and common electrode terminals 829, 831 may be purchased from Frederick Co., Huntington Valley, Pa. In order to understand the operation of potentiometer 793, it should be recognized that tube 823 has an axial plane of symmetry which is intersected by tube 823 along convex line 833 and along concave line 835. In addition, line N is defined as a straight line connecting the centers of the ends of tube 823. According to the operation of potentiometer 793, when tube 823 is positioned such that convex line 833 is positioned above concave line 835 and such that line N is horizontal, the resistance between terminals 825 and 829 ("first resistance") and the resistance between terminals 827 and 831 ("second resistance") are equal. As tube 823 is moved so that line N is angularly deflected from the horizontal such that terminal 825 is positioned below terminal 827, the first resistance becomes less than the second resistance. As tube 823 is moved so that line N is angularly deflected from the horizontal such that terminal 825 is positioned above terminal 827, the first resistance becomes greater than the second resistance.

Potentiometer 793 is securely mounted in channel 809 of casing 797 using RTV potting with convex line 833 facing generally upwardly, and such that line N is parallel to the axis of casing block 797 whereby line N will be parallel to axis R.

Transducer 668 may further include temperature controlling apparatus for maintaining the potentiometer at a fairly constant temperature in accordance with manufacturer's specifications. As shown in FIGS. 2A and 9, such apparatus may include heater 811 secured to casing 797 and thermocouple 813 mounted in casing 797. Heater 811 and thermocouple 813 are connected to a conventional circuit such that a current is supplied to heater 811 in accordance with the current generated by thermocouple 813.

Level actuator 657 is substantially identical to actuator 655 and reference should be had to the detailed description of actuator 655 for an understanding of actuator 657. Actuator 657 differs from actuator 655 only with respect to the position of actuator 657 on bench 511. In order to describe this difference, pertinent parts of actuator 657 are identified in FIGS. 2 and 3 with the reference numbers used to identify the corresponding parts of actuator 655 with the letter "A" added. In accordance with this identification method, platform 671A of actuator 657 is secured to bench 511 such that lower surface 676A of platform 671A fully juxtaposes the upper surface of bench 511. Platform 671A is positioned adjacent the left side of bench 511 about midway along the length of side 525 such that the axis of platform 671A that corresponds to axis R of platform 671 is parallel to axis F.

In accordance with the description of actuators 655, 657, it can be seen that transducers 668, 668A have axes corresponding to the axis of casing blocks 797, 797A, respectively, and that transducers 668, 668A provide outputs of electrical significance, i.e., the relationship of the first resistance to the second resistance, that varies according to the slope of the axis of transducers 668, 668A to the horizontal. Furthermore, it can be seen that the slope of the axis of transducers 668, 668A can be varied by rotation of sprockets 703, 703A of support units 667, 667A. For the purposes of this description, it will be understood that the slope of the axis of a transducer is "level" when such axis is parallel to the horizontal plane; that the slope of the axis of transducer 668 ("S668") when terminal 825 is positioned above terminal 829 and the slope of the axis of transducer 668A ("S668A") is "negative" when terminal 825A is positioned above terminal 829A; and that S668 is "positive" when terminal 825 is positioned below terminal 829 and S668A is "positive" when terminal 825A is positioned below terminal 829A. Thus, when a transducer is level, the first resistance and the second resistance of that transducer are equal; when the slope of the axis of a transducer is negative, the first resistance of that transducer is greater than the second resistance of that transducer; and when the slope of the axis if a transducer is positive, the first resistance of that transducer is less than the second resistance of that transducer.

It should be noted that the axis of transducer 668 moves in a plane parallel to that in which axis E moves and the axis of transducer 668A moves in a plane parallel to that in which axis F moves. Therefore, the above-described sign conventions for S668, S668A correspond to those for SE, SF respectively.

Actuator drive and indication device 659 includes indicator unit 837, knob drive mechanism 839, and sprocket drive mechanism 841 (see FIG. 2A).

Indicator unit 837 is a commercially-available mechanical counter unit that provides a digital readout based on the rotation of a shaft. In the preferred embodiment, unit 837 has casing 843 with drive shaft 845 extending from opposite ends of casing 843. Furthermore, unit 837 preferably has separate indicator scales 847, 849. According to the operation of such a unit, indicator unit 837 has a zero reading at which both scales 847, 849 have a zero readout. If shaft 845 is rotated clockwise (viewing shaft 845 from the right of FIG. 2), scale 847 will count up from zero while scale 849 is covered with a shutter. If shaft 845 is then rotated counterclockwise, scale 847 will count down to zero at which time, with further counterclockwise rotation of shaft 845, scale 847 will be covered with a shutter, the shutter on scale 849 will open and scale 849 will count up. If shaft 845 is then rotated clockwise, scale 849 will count down until zero is reached. Such an indicator unit is available from Durant.

Unit 837 is secured to bench 511 adjacent the left edge of bench 511 such that scales 847, 849 face upwardly and with shaft 845 oriented substantially parallel to axis F. The end of shaft 845 extending toward the rear edge of bench 511 should be aligned with sprocket 703 of actuator 655.

Knob drive mechanism 839 includes 1:1 right angle turn bevel gears 851, 853, shaft 855, shaft support 846 and knob 857. Gear 851 is secured to shaft 845 of unit 837 with gear teeth 854 of gear 851 facing away from unit 837. Shaft 855 extends through shaft support 846, which is attached to bench 511, and left wall 17 of housing 11 and is rotatably secured therein such that the axis of shaft 855 perpendicularly intersects the axis of shaft 845. Gear 853 is secured to the end of shaft 855 inside of housing 11 such that the teeth of gear 853 mesh with the teeth of gear 851. Knob 857 is fixedly attached to the end of shaft 855 outside of housing 11. Thus, mechanism 839 provides a right-angle drive train for shaft 845.

Sprocket drive mechanism 841 includes drive sprocket 865 secured to the end of shaft 845 facing toward the rear edge of bench 511 and sprocket drive chain 867 connecting sprocket 865 to sprocket 703 of actuator 655.

In accordance with the above-description of device 659 and its connection to actuator 655, clockwise rotation of knob 857 will result in positive change in slope of the axis of transducer 668, and counter-clockwise rotation of knob 857 will result in negative change in slope of the axis of transducer 668. Actuator 655 and device 659 should be connected together such that device 659 provides a zero reading when the axis of transducer 668 is parallel to axis E. As a result, the readings on scales 847, 849 will represent the slope of axis E with respect to the axis of transducer 668, such slope of axis E referred to as "SE'". The sign of SE' will be indicated in accordance with the scale giving a reading and the magnitude of SE' will be represented by the value of such reading. It should be noted that when S668 is level, the axis of transducer 668 is horizontal whereby at such time, SE' is equal to SE. Thus, when S668 is level: (1) a zero reading on indicator unit 837 will indicate that SE is zero; (2) a reading on scale 849 will indicate that SE is positive; and (3) a reading on scale 847 will indicate that SE is negative.

Top 13 of housing 11 has view windows 850, 852 disposed above scales 847, 849, respectively, so that the scales can be read from outside housing 11 (See FIG. 1).

Actuator drive indication device 661 includes indicator unit 869, knob drive mechanism 871, and sprocket drive mechanism 873.

Indicator unit 869 is identical to unit 837 of device 659 and has casing 875, drive shaft 877 and scales 879, 881 corresponding to scales 847, 849, respectively, of unit 837. Unit 869 is secured to bench 511 between actuator 657 and unit 837 such that the axis of shaft 877 is perpendicular to that of shaft 845.

Sprocket drive mechanism 873 includes drive sprocket 883 secured to the part of shaft 877 extending toward left wall 17 of housing 11, and sprocket drive chain 885 connecting sprocket 883 to sprocket 703A of actuator 657.

Knob drive mechanism 871 includes 1:1 bevel gears 871A, 871B, shaft 871C and knob 871E. Gear 871A is secured adjacent sprocket 883 to the extreme end of shaft 877. Shaft 871C extends through shaft support 871D, which is attached to bench 511, and left wall 17 of housing 11 and is rotatably secured therein such that the axis of shaft 871C is parallel to and spaced to one side of shaft 877. Gear 871B is secured to the end of shaft 871C inside of housing 11 such that the teeth of gear 871B mesh with the teeth of gear 871A. Knob 871E is fixedly attached to the end of shaft 871C outside of housing 11. Thus, mechanism 871 provides an angular direction reversing drive train for shaft 877.

In accordance with this description of device 661 and its connection to actuator 657, counterclockwise rotation of knob 871E will result in positive change in slope of the axis of transducer 668A and clockwise rotation of knob 871E will result in negative change in slope of the axis of transducer 668A. Actuator 657 and device 661 should be connected together such that device 661 provides a zero reading when the axis of transducer 668A is parallel to axis F. As a result, the readings on scales 879, 881 will represent the slope of axis F with respect to the axis of transducer 668A, such slope of axis F referred to as "SF'". The sign of SF' will be indicated in accordance with the scale giving a reading and the magnitude of SF' will be represented by the value of such reading. It should be noted that when S668A is level, the axis of transducer 668A is horizontal whereby, at such time, SF' is equal to SF. Thus, when S668A is level: (1) a zero reading on indicator unit 869 will indicate that SF is zero; (2) a reading on scale 881 will indicate that SF is positive; and (3) a reading on scale 879 will indicate that SF is negative.

Top 13 of housing 11 has view windows 880, 882 (see FIG. 1) disposed above scales 879, 881, respectively, so that the scales can be read from outside housing 11. (See FIG. 1) Level actuators 655, 657 and actuator drive and indication devices 659, 661 may be mounted on a platform parallel to, spaced above and secured to bench 511 so that the scales of the indication devices will be adjacent windows 850, 852, 880, 882.

Circuitry 663 comprises two substantially identical motor-drive circuits 888. Each motor-drive circuit 888 is connected to the terminals of one or the other of transducers 668, 668A and provides a d-c output of varying polarity across two output terminals; more specifically, each motor-drive circuit provides a d-c output of one polarity when the transducer connected to the circuit has a positive slope, a d-c output of the opposite polarity when such transducer has a negative slope, and a zero output when the axis of such transducer is parallel to the horizontal plane, that is, when such transducer is "level".

Figure 12:
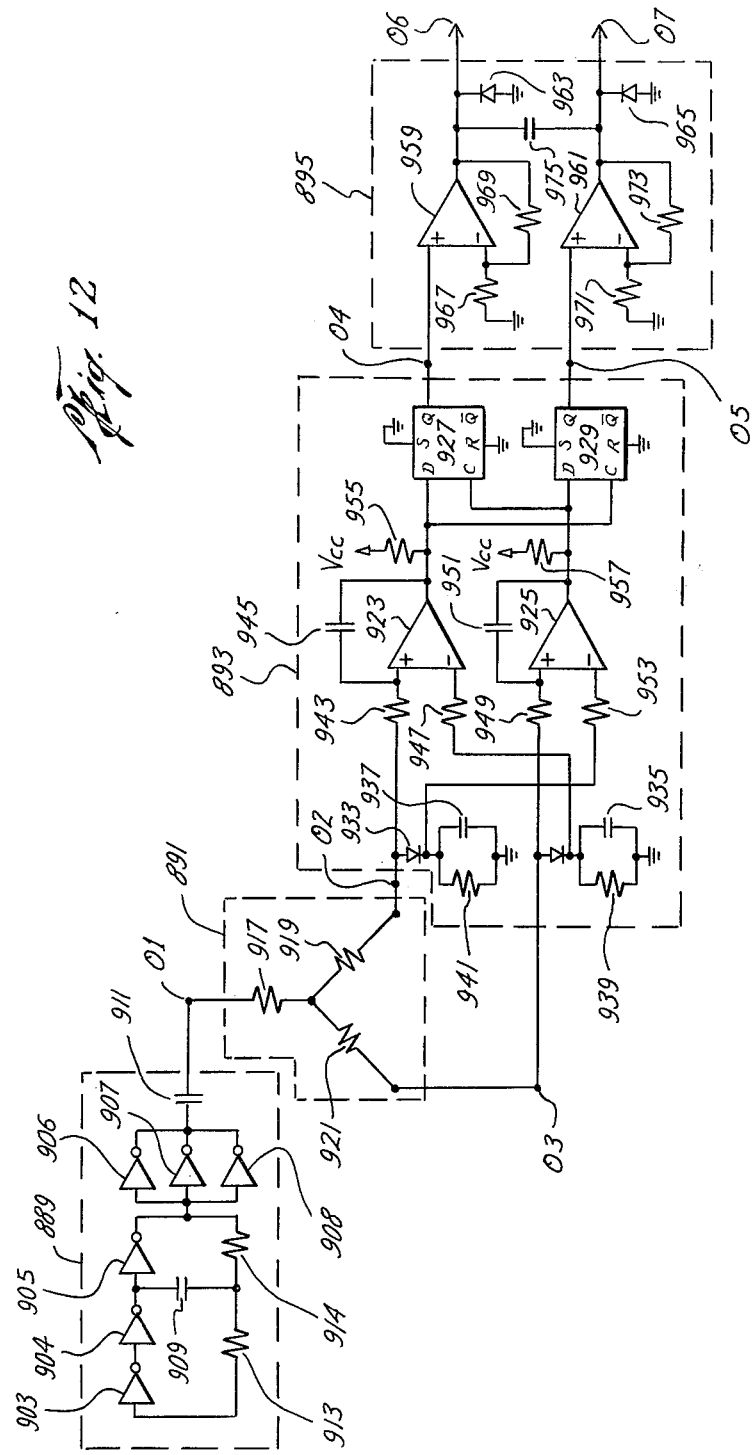
FIG. 12 is a schematic of the motor-drive circuit of the preferred embodiment of the apparatus of the invention.

Referring to FIG. 12, the preferred embodiment of each motor-drive circuit 888 includes excitation voltage generator 889, bridge 891, comparator 893 and amplifier 895.

Bridge 891 includes a plurality of resistances to which the potentiometer of one of the transducers is connected such that the first and second resistance are two resistances in a series of voltage dividers all excited by a common excitation signal.

Generator 889 is connected to bridge 891 and provides the common excitation signal for the voltage dividers of bridge 891. In order to avoid polarization of the electrolyte of the electrolytic potentiometer of the transducer, the output signal of generator 889 is a-c with no substantial d-c component.

Comparator 893 is connected to the outputs of the voltage dividers of bridge 891 and includes circuitry for comparing the voltages of such outputs and providing a variable polarity d-c output based on the comparison. The configuration of comparator 893 and the configuration of bridge 891 should correspond to one another such that the output of comparator 893 is zero when the first resistance equals the second resistance, has one polarity when the first resistance is greater than the second resistance, and has the opposite polarity when the second resistance is greater than the first resistance. In view of the a-c nature of the excitation voltage, the output voltages of bridge 891 will be a-c. Depending on the comparison circuitry of comparator 893, comparator 893 may further include rectification and filtering means for converting the output voltages of bridge 891 to substantially d-c voltages.

Amplifier 895 is connected to the output of comparator 893 and includes power amplification circuitry for amplifying the output of comparator 893 so that such output can drive the electric motors of the motor/drive units of the support mechanism. Depending on the configuration of the power amplification circuitry of amplifier 895, the output of amplifier 895 may have a polarity reversed from the output of comparator 893.

It should be noted that any of a wide variety of specific component arrangements may be used to perform the desired purposes of the motor-drive circuit in accordance with the preferred embodiment described above. One component arrangement, however, has been found to provide especially efficient and accurate results. This arrangement is shown in FIG. 12 and will be described in terms of specific component interconnections and specific component values and types. It will be appreciated, however, that the specific interconnections or component values or types can be varied somewhat without departing from the spirit of the particularly desirable component arrangement set forth.

In order to facilitate the description of motor-drive circuits 888, it will be understood that such circuit is connected to a 12 VDC source of power, the actual connections described infra in conjunction with FIG. 13. In FIG. 12, connections to the positive side of such source of power are referenced as "$V_{cc}$" and connections to the negative side of such source are referenced either with a ground symbol or by "GND". In this regard, it should be noted that the circuit of FIG. 12 includes various integrated components including digital inverters, differential comparators, D-type flip-flops and amplifiers illustrated by appropriate symbols. Each of these components are connected to $V_{cc}$ and ground in accordance with the particular circuitry, such as the type of integrated circuit, employed. Because such connections vary widely, the precise connections are not shown in FIG. 12. Where specific component types are identified, however, precise pin connection for $V_{cc}$ and ground will be described.

Generator 889 includes the following components:

| Component | Reference No. | Preferred Type Or Value |
|---|---|---|
| Inverter | 903 | 1/6 CD4069UB |
| Inverter | 904 | 1/6 CD4069UB |
| Inverter | 905 | 1/6 CD4069UB |
| Inverter | 906 | 1/6 CD4069UB |
| Inverter | 907 | 1/6 CD4069UB |
| Inverter | 908 | 1/6 CD4069UB |
| Capacitor | 909 | 470 pfd. |
| Capacitor | 911 | 10 mfd. |
| Resistor | 913 | 100 Kohm |
| Resistor | 914 | 100 Kohm |

(Note: For CD4069UBM, $V_{cc}$ is connected to pin 14 and ground is connected to pin 7. This gives power to all inverters). The interconnection of these components is as follows: the input of inverter 903 is connected to one side of resistor 913. The output of inverter 903 is connected to the input of inverter 904. The output of inverter 904 is connected to the input of inverter 905 and to one side of capacitor 909. The output of inverter 905 is connected to each of the inputs of inverters 906–908 and to one side of resistor 914. The outputs of inverters 906–908 are all connected to one side of capacitor 911. The other side of the capacitor constitutes the output either 01 of generator 839 and is connected to bridge 891 as described infra. The side of resistor 913 not connected to inverter 903, the side of resistor 914 not connected to inverter 905, and the side of capacitor 909 not connected to inverter 904 are all connected together.

In accordance with the FIG. 13 configuration of generator 889, when power is supplied to the inverters, generator 889 will self-start and will provide a square-wave a-c signal having substantially no d-c component at output 01. When the component types and values designated are used, the peak values of the square-wage signal will be approximately ±2.5 volts and the frequency of the signal will be approximately 1 Khz.

Bridge 891 includes the following components:

| Component | Reference No. | Preferred Value |
|---|---|---|
| Resistor | 917 | 1 Kohm |
| Resistor | 919 | 1 Kohm |
| Resistor | 921 | 1 Kohm |

(Note: Resistors 919 and 921 should be equal to one another within 1% tolerance.) One side of resistor 917 is the excitation signal input of bridge 891 and is connected to the side of capacitor 911 that constitutes output 01 of generator 889. The other side of resistor 917 is connected to one side of resistor 919 and to one side of resistor 921. The other side of resistors 919, 921 constitute outputs 02, 03, respectively, of bridge 891.

Referring to FIG. 13, potentiometer 793 is connected to bridge 891 of one of the motor-drive circuits 888 as follows: terminal 825 is connected to 02; terminal 827 is connected to 03; and terminal 829 is connected to ground. Potentiometer 793A is connected to bridge 891 of the other motor-drive circuit 888 as follows: terminal 825A is connected to 02; terminal 827A is connected to 03; and terminal 829A is connected to ground. The wires connecting the motor drive circuits to potentiometers 793, 793A extend through passages 810, 810A, respectively. In accordance with this configuration, for each motor-drive circuit, the voltage at 02 constitutes the divided voltage of a first voltage divider comprising the series combination of resistors 917, 919 on the high side of the divider and the first resistance of one of the transducers on the low side of the divider. The voltage at 03 constitutes the divided voltage of a second voltage divider comprising the series combination of resistors 917, 921 on the high side of the divider and the second resistance of such transducer on the low side of the divider. The output signal of generator 889 is the voltage divided by both voltage dividers. Thus, the signals at 02 and 03 will be squarewaves of the same frequency as the signal at 01 with the peak values varying in accordance with the slope of the axis of the transducer connected to the motor-drive circuit. More specifically, when such slope is level, the peak values of the signals at 02, 03 will be equal. When such slope is negative, the first resistance will be greater than the second resistance and the peak values of the signal at 02 will be less than those of the signal at 03. When such slope is positive the first resistance will be less than the second resistance and the peak values of the signal at 02 will be greater than those at 03. The signals at 02 and 03, however, will be in phase and will have substantially equal peak-to-peak transition times, such transition times being substantially equal to those of the signal at 01.

Comparator 893 includes the following components:

| Component | Reference Number | Preferred Type or Value |
|---|---|---|
| Differential Comparator | 923 | 3290 |
| Differential Comparator | 925 | 3290 |
| D-Type Flip-Flop | 927 | ½ 4093 |
| D-Type Flip-Flop | 929 | ½ 4093 |
| Diode | 931 | IN 914 |
| Diode | 933 | IN 914 |
| Capacitor | 935 | 1.5 mfd |
| Capacitor | 937 | 1.5 mfd |
| Resistor | 939 | 1 Mohm |
| Resistor | 941 | 1 Mohm |
| Resistor | 943 | 10 Kohm |
| Capacitor | 945 | 2.2 pfd |
| Resistor | 947 | 10 Kohm |
| Resistor | 949 | 20 Kohm |
| Capacitor | 951 | 2.2 pfd |
| Resistor | 953 | 10 Kohm |
| Resistor | 955 | 10 Kohm |
| Resistor | 957 | 10 Kohm |

(Note: for the 3290 chips, $V_{cc}$ is connected to pin 8 and ground is connected to pin 4. For the 4013 chip, $V_{cc}$ is connected to pin 14 and ground is connected to pin 7.) The cathode of diode 933 is connected to output 02 of bridge 891 and to one side of resistor 943. The anode of diode 933 is connected to one side of resistors 941, 953 and to one side of capacitor 937. The other side of capacitor 937 and resistor 941 are connected to ground. The cathode of diode 931 is connected to output 03 of bridge 891 and to one side of resistor 949. The anode of diode 931 is connected to one side of resistors 939, 947 and to one side of capacitor 935. The other side of capacitor 935 and resistor 939 are connected to ground.

The other side of resistor 943 is connected to the positive input of comparator 923 and to one side of capacitor 945. The other side of capacitor 945 is connected to the output of comparator 923, to one side of resistor 955, to the D input of flip-flop 927 and to the clock ("C") input of flip-flop 929. The other side of resistor 955 is connected to $V_{cc}$. The other side of resistor 947 is connected to the negative input of comparator 923.

The other side of resistor 949 is connected to the positive input of comparator 925 and to one side of capacitor 951. The other side of capacitor 951 is connected to the output of comparator 925, to one side of resistor 957, to the D input of flip-flop 929 and to the clock input of flip-flop 927. The other side of resistor 957 is connected to $V_{cc}$. The other side of resistor 953 is connected to the negative input of comparator 925.

The set and reset inputs of flip-flops 927, 929 are all connected to ground. The Q outputs of flip-flops 927, 929 constitute outputs 04, 05, respectively, of comparator 893.

In accordance with the above-described configuration of comparator 893, comparators 923, 925 have the characteristics of a Schmitt-trigger circuit wherein a logical high output is provided when a signal voltage is above a reference voltage and a low output is provided when the signal voltage is below the reference voltage. In the configuration of comparator 893 as shown and described, the signal voltage is applied to the positive inputs of comparators 923, 925 and the reference voltage is applied to the negative inputs of comparators 923, 925.

Thus, for comparator 923, the signal voltage is the a-c signal at output 02 and the reference voltage is a substantially d-c signal resulting from rectification and a-c filtering of the a-c signal at output 03, such rectification and filtering being accomplished by diode 931 and capacitor 935, respectively. Therefore, the level of the reference voltage of comparator 923 is directly related to the positive peak voltage of the signal at output 03. In this regard, resistor 939 provides a bleed-off path for the charge on capacitor 935 so that the reference voltage of comparator 923 decreases as the positive peak voltage of the signal at output 03 decreases. For comparator 925, the signal voltage is the a-c signal at output 03 and the reference voltage is a substantially d-c signal resulting from rectification and a-c filtering of the a-c signal at output 02, such rectification and filtering being accomplished by diode 933 and capacitor 937, respectively. Therefore, the level of the reference voltage of comparator 925 is directly related to the positive peak voltage of the signal at output 02. In this regard, resistor 941 provides a bleed-off path for the charge on capacitor 937 so that the reference voltage of comparator 925 decreases as the positive peak voltage of the signal at output 02 decreases.

As a result, for each motor-drive circuit when the peak values of the signals at 02, 03 are equal, i.e., when the transducer connected to such motor-drive circuit is level, comparators 923, 925 will both provide positive-going logic pulses of equal periods at their outputs, the pulses being in phase. When the peak value of the signal at 02 is greater than that at 03, i.e., when the slope of the axis of the transducer connected to such circuit is negative, comparators 923, 925 will provide positive-going logic pulses at their outputs, the period of the pulse at the output of comparator 923 beginning before that of the pulse at the output of comparator 925 and ending after that of the pulse at the output of comparator 925. Conversely, when the peak value of the signal at 03 is greater than that at 02, i.e., when the slope of the axis of the transducer connected to such circuit is positive, comparators 923, 925 will provide positive-going logic pulses at their outputs, the period of the pulse at the output of comparator 923 beginning after that of the pulse at the output of comparator 925 and ending before that of the pulse at the output of comparator 925.

It has been found that with D-type flip-flops 927, 929 connected to such comparator outputs in the manner indicated, 04 and 05 are both low when the peak values of 02 and 03 are equal, 04 is high and 05 is low when the peak value of 02 is greater than that of 03, and 04 is low and 05 is high when the peak value of 02 is less than that of 03.

Amplifier 895 of FIG. 12 includes the following components:

| Component | Reference No. | Preferred Type or Value |
|---|---|---|
| Amplifier | 959 | uA759HC |
| Amplifier | 961 | uA759HC |
| Diode | 963 | IN914 |
| Diode | 965 | IN914 |
| Resistor | 967 | 100 Kohm |
| Resistor | 969 | 100 Kohm |
| Resistor | 971 | 100 Kohm |
| Resistor | 973 | 100 Kohm |
| Capacitor | 975 | .01 Mfd at |

| Component | Reference No. | Preferred Type or Value |
|---|---|---|
| | | 100 VDC |

(Note: for uA759HC, $V_{cc}$ is connected to pin 7 and ground is connected to pin 4). The interconnection of these components is as follows: The non-inverting inputs of amplifiers 959, 961 are connected to 04 and 05, respectively, of comparator circuit 893. The inverting input of amplifier 959 is connected to one side of resistor 967 and to one side of resistor 969. The other side of resistor 967 is connected to ground and the other side of resistor 969 is connected to the output of amplifier 959. The inverting input of amplifier 961 is connected to one side of resistor 971 and to one side of resistor 973. The other side of resistor 971 is connected to ground and the other side of resistor 973 is connected to the output of amplifier 961. The output of amplifier 959 constitutes output 06 of amplifier circuit 895 and is further connected to the anode of diode 963 and to one side of capacitor 975. The output of amplifier 961 constitutes output 07 of amplifier circuit 895 and is further connected to the anode of diode 965 and to the other side of capacitor 975. The cathodes of diodes 963, 965 are connected to ground.

Outputs 06 and 07 together constitute the output of the motor-drive circuit. In accordance with the configuration of amplifier circuit 895 shown in FIG. 12 and described above, when 04 and 05 are both low, i.e., when the slope of the axis of the transducer connected to such motor-drive circuit is level, 06 and 07 will have an equal potential with respect to ground whereby the output of the motor-drive circuit will be zero. When 04 is high and 05 is low, i.e., when the slope of the axis of the transducer connected to such motor-drive circuit is negative, the potential at 06 will be greater than that at 07 with respect to ground whereby the output of the motor-drive circuit will be a potential of a first polarity. When 04 is low and 05 is high, i.e., when the slope of the axis of the transducer connected to such motor-drive circuit is positive the potential at 06 will be less than that at 07 with respect to ground whereby the output of the motor-drive circuit will be a potential of a second polarity opposite that of the first polarity. For the amplifier circuit shown and described, the magnitude of the potential will be approximately 12 VDC for both polarities.

As illustrated in FIG. 13, outputs 06 and 07 of the motor-drive circuit connected to potentiometer 793 are connected to terminal posts 371, 373, respectively, of terminal unit 367. This interconnection includes wires extending from circuit board 664 through passages 115 and 242 into housing unit 215. In accordance with the terminology used in this application and the operation of the motor-drive circuit described above, it can be seen that (1) when S668 is level, a zero potential is applied to terminal unit 367; (2) when S668 is positive, a positive potential is applied to terminal unit 367; and (3) when S668 is negative a negative potential is applied to terminal unit 367.

Outputs 06 and 07 of the other motor-drive circuit are connected to terminals 379, 381, respectively. Thus, (1) when S668 is level, a zero potential is applied to terminal unit 369; (2) when S668 is positive a positive potential is applied to terminal unit 369; and (b 3) when S668A is negative, a negative potential is applied to terminal unit 369.

7. Beacon Units

As shown in FIG. 1, the preferred embodiment of the apparatus of the invention also includes two beacon units 1001 releasably attached to the outside of the front of housing 11.

As shown in FIGS. 14 and 15, each beacon unit 1001 of the preferred embodiment includes base plate 1003, beacon housing 1005, turret mechanism 1007, pentaprism 1009, turret drive mechanism 1011, and electrical system 1013.

Base plate 1003 has a generally flat, rectangular base portion 1014 having circular passage 1015 therethrough about one-fourth the length of portion 1014 from one end of portion 1014. The axis of passage 1015 is perpendicular to flat lower surface 1016 of portion 1014. Portion 1014 further includes circular passage 1017 extending therethrough proximate to the other end of base plate 1003. Base plate 1003 also has cylindrical housing 1019 with cylindrical chamber 1020 extending above portion 1014 coaxial with passage 1015 and motor mount block 1021 adjacent housing 1019. Block 1021 includes gear passage 1023 having an axis perpendicular to that of housing 1019. The diameter of passage 1023 is such that passage 1023 communicates with cylindrical chamber 1020 of housing 1019. Block 1021 also includes motor mount passages 1025, 1027 above and below passage 1023. Preferably, base plate 1003, including portion 1014, housing 1019 and block 1021, is made of a single piece of cast aluminum.

Beacon housing 1005 is a metal box open on one side and attached to the upper surface of portion 1014 of base plate 1003 so as to cover housing 1019 and block 1021 as well as the majority of the upper surface of portion 1014. The length of housing 1005 is less than that of portion 1014 such that housing 1005 does not cover passage 1017. Housing 1005 has circular passage 1031 coaxial with passage 1015 of portion 1014 of base plate 1003. Housing 1005 also has circular passage 1033 coaxial with gear passage 1023 of block 1021 of base plate 1003 and cable access passage 1035 through the side of housing 1005 adjacent passage 1017 of base plate 1003.

Turret mechanism 1007 includes drive shaft 1037 rotatably secured within chamber 1020 of housing 1019 such that upper end 1039 of shaft 1037 extends through passage 1031 of housing 1005; turret gear 1041 secured to shaft 1037 adjacent passage 1023 of block 1021; and turret housing 1043 secured to end 1039 of shaft 1037 above housing 1005 by means of set screw 1045 extending through the base of turret housing 1043 and engaging end 1039 of shaft 1037. Shaft 1037 has axial passage 1047 therethrough. Turret housing 1043 has prism chamber 1049 communicating with passage 1047 of shaft 1037 and transverse passage 1051 extending from the outside of housing 1043 to chamber 1049. Passage 1051 has an axis that perpendicularly intersects the axis of passage 1015 of portion 1014 of base plate 1003. Turret housing 1043 further includes coaxial threaded passages 1053, 1055 having an axis perpendicular to that of passage 1051 extending from the outside of housing 1043 to chamber 1049. Screws 1057, 1059 are threaded into passages 1053, 1055, respectively.

Pentaprism 1009 is substantially the same as pentaprism 551 except that the surface of pentaprism 1009 corresponding to surface 559 of pentaprism 551, e.g., surface 1061, is fully internally-reflective such that all the light of a beam incident on the surface of pentaprism 1009 corresponding to surface 555 of pentaprism 551, i.e., surface 1063, is deviated through an angle of 90 degrees and emerges from the surface of pentaprism 1009 corresponding to surface 557 of pentaprism 551, i.e., surface 1065. Pentaprism 1009 is secured within chamber 1049 of turret housing 1043 by screws 1057, 1059 such that surface 1063 faces downwardly toward passage 1015 of base plate 1003 and surface 1065 faces toward passage 1051. In accordance with this construction, it can be seen that a beam of light entering passage 1047 of shaft 1037 through passage 1015 and directed through passage 1047 will be deviated through an angle of 90 degrees and be directed outwardly from passage 1051 of turret housing 1043.

Turret drive mechanism includes (1) motor unit 1067 having output shaft 1069 and input terminals 1071, 1973, knob 1074 and (2) worm gear 1075. Motor unit 1067 is secured to block 1021 by screws extending through motor mount passages 1025, 1027 such that shaft 1069 extends through gear passage 1023 of block 1021 and passage 1033 of housing 1005. Knob 1074 is secured to the end of shaft 1069 extending outside of passage 1033. Worm gear 1075 is fixedly secured to shaft 1069 within passage 1023 such that gear 1075 meshes with gear 1041 of turret mechanism 1007.

Preferably, motor unit 1067 has a configuration such that shaft 1069 will rotate when a direct current signal is applied across terminals 1071, 1973. Thus, when a 12 VDC potential is applied to terminals 1071, 1073 of motor unit 1067, shaft 1037 of turret mechanism 1007 will rotate by action of gears 1041, 1075 whereby turret housing 1043 will rotate. In accordance with such configuration and operation, it can be seen that a beam directed through passage 1047 of shaft 1037 and deviated by pentaprism 1009 through passage 1051 will sweep through a plane perpendicular to the direction of the beam prior to deviation when a potential is applied across terminals 1071, 1973.

Electrical system 1013 includes power cable 1077, potentiometer 1079, single-pole, single-throw toggle switch 1081 and wires 1083, 1085. Potentiometer 1079 has arm terminal 1087 and end terminal 1089 and control shaft 1091. Potentiometer 1079 is secured to housing 1005 such that terminals 1087, 1089 are inside housing 1005 and shaft 1091 extends outside of housing 1005. Potentiometer 1079 further includes knob 1093 attached to shaft 1091 outside housing 1005. Switch 1081 has toggle lever 1095 and terminals 1097, 1099 and is secured to housing 1005 such that toggle lever 1095 is outside housing 1005 and terminals 1097, 1099 are inside housing 1005. Power cable 1077 has a pair of wires therein. One end of cable 1077 extends through passage 1035 of housing 1005 and is secured therein by strain relief 1103. One wire of cable 1077 is connected to terminal 1099 of switch 1081 and the other wire of cable 1077 is connected to terminal 1089 of potentiometer 1079. Terminal 1071 of motor unit 1067 is connected to terminal 1097 of switch 1081. Terminal 1073 of motor unit 1067 is connected to terminal 1087 of potentiometer 1079.

The other end of cable 1077 has two-terminal female connector 1105 having a configuration which will mate with connector 129 or connector 131 as shown in FIG. 1. Thus, when 12 VDC power is applied across the terminals of connectors 129, 131 as set forth infra in the description of the power supply system, a 12 VDC potential will be applied across the wires of cable 1077. If switch 1081 is closed, a direct current signal will be applied across terminals 1071, 1073 of motor unit 1067 and turret housing 1043 will rotate. The rate of rotation can be controlled by adjusting potentiometer 1079.

Beacon unit 1001 of the type just described is old in the art, and no claims to the novelty of the beacon unit, as a separate structure, or any component part thereof, are made herein.

A beacon unit 1001 may be selectively mounted on front portions 25, 61, 101 of top 13, left wall 17, right wall 19, respectively, by juxtaposing surface 1016 of beacon unit 1001 to the appropriate front portion. The axis of passage 1015 should be substantially coincident with axis C when mounted on top 13 or with axis E when mounted on left wall 17 or right wall 19. In the preferred embodiment, top 13, left wall 17 and right wall 19 include threaded passages 1107, 1109, 1110, respectively, which are coaxial with passage 1017 of beacon unit 1001 when such a unit is mounted on the corresponding front portion. Beacon unit 1001 further includes thumbscrew 1111 extending through passage 1017 which can be threaded into passages 1107, 1109 or 1110 so that beacon unit is appropriately secured to top 13, left wall 17, or right wall 19, respectively.

A beacon unit 1001 may similarly be mounted on the front of housing 11 using adapter plate 1113. Adapter plate 1113 (See FIGS. 2B, 3B) includes flat parallel surfaces 1115, 1117, knob passage 1119 and threaded passage 1121. Surface 1115 of plate 1113 is juxtaposed to front wall 21 of housing 11 and is secured thereto by screws extending through plate 1113 and threaded into front wall 21 such that knob 609 is disposed within knob passage 1119. The thickness of adapter plate 1113 should be such that no part of knob 609 extends out of passage 1119 at surface 1117. Beacon unit 1001 is then attached to plate 1113 by juxtaposing surface 1016 of unit 1001 to surface 1117 of plate 1113 such that passage 1015 is substantially coaxial with axis F. Unit 1001 can be secured in this position by threading screw 1111 into passage 1121.

In accordance with the foregoing description of unit 1001 and the mounting of unit 1001 on housing 11, it can be seen that if a beacon unit is mounted on the front of housing 11 and is activated, the undeviated beam emerging from knob 609 will be rotated in a plane perpendicular to axis F ("front plane"). If a beacon unit is mounted on left wall 17 and knob 609 is turned so that the deviated beam is directed left, or if a beacon unit is mounted on right wall 19 and knob 609 is turned so that the deviated beam is directed right, the deviated beam will be rotated in a plane perpendicular to axis E ("left plane" and "right plane," respectively). If a beacon unit is mounted on top 13 and knob 609 is turned so that the deviated beam is directed up, the deviated beam will be rotated in a plane perpendicular to axis C ("top plane").

8. Power Supply System

Power is supplied to the preferred embodiment of the apparatus of the invention by an external 12 VDC power supply through connector 127. Most commercial laser beam sources, such as the Model 80-T5 laser tube of coherent radiation, require an input voltage of several thousand volts, the power supply system of the preferred embodiment of the apparatus of the invention includes DC-DC power source 1201 for converting 12 VDC to the voltage necessary to power the laser beam source. (See FIG. 2B). Source 1201 includes positive input terminal 1203, negative input terminal 1205, positive output terminal 1207 and negative output terminal 1209.

The power supply system further includes a wiring system for connecting connector 127 to connectors 129, 131, power supply 1201 and the motor-drive circuits such that 12 VDC power can be supplied to such components and circuits by closing switch 151 and disconnected from such components and circuits by opening switch 151. Thus, referring to FIG. 13, terminal 127A, to which the positive side of the external 12 VDC supply is connected, is connected to terminal lug 155 of switch 151. Terminal lug 157 of switch 151 is connected to terminal 129A of connector 129, terminal 131A of connector 131, terminal 1203 of source 1203 and $V_{cc}$ of both motor-drive circuits 888. Terminal 127B is connected to terminals 129B, 131B, 1205 of connectors 129, 131 and source 1201, respectively, and to GND of both motor-drive circuits 888. Terminals 1207, 1209 of source 1201 are connected to terminals 532, 534, respectively of tube 531.

9. Overall Operation

Operation of the apparatus of the preferred embodiment of the invention as described supra includes the initial steps of placing the apparatus on a substantially planar, fixedly-oriented support surface as set forth in the description of the support mechanism, and connecting a 12 VDC source to connector 127 and closing switch 151. This will activate tube 531 thus generating an undeviated beam directed from knob 609 and a deviated beam directed from one of passages 31 of top 13, 67 of left wall 17, or 107 of right wall 19 depending on the position of beam splitting device 549. In all cases, the deviated beam will be perpendicular to the undeviated beam.

In order to establish two reference lines, as opposed to reference planes, all beacon units and adaption plate 1113 are removed from housing 11.

If, for the particular use, two substantially horizontal reference lines are desirable, knob 609 can be turned to its extreme clockwise position, viewing housing 11 from the rear, so as to direct the deviated beam to the left ("left-directed beam"), or turned to its extreme counter-clockwise position so as to direct the deviated beam to the right ("right-directed beam"). If, instead, a substantially horizontal reference line and a substantially vertical reference line are desirable, knob 609 should be turned to its center locked position so as to direct the deviated beam up ("up-directed beam"). It should be noted that in accordance with the foregoing, no movement of housing 11 is required, although three different sets of reference lines are provided. Furthermore, the direction of the undeviated beam remains constant while the direction of the deviated beam is changed.

The direction of the substantially horizontal reference lines provided as described above may be adjusted by turning knob 428 of rear support unit 163 as set forth in the description of the support mechanism. Thus, as knob 428 is rotated clockwise, the undeviated beam will rotate counter-clockwise (viewing housing 1 from above) about axis C; as knob 428 is rotated counter-clockwise, the undeviated beam will rotate clockwise about axis C. If, during such adjustment of knob 428, the deviated beam is directed left or right, such beam will rotate in the same direction as the undeviated beam rotates while maintaining a perpendicular relationship to the undeviated beam.

In addition, when the 12 VDC source is connected to connector 127 and switch 151 is closed, power will be supplied to the motor-drive circuits. Thus, depending on S668 and S668A, voltage potentials may be applied to terminal units 367, 369 in accordance with the operation of the level control mechanism as set forth supra. As set forth in the description of the support mechanism and illustrated in Table 1, such potentials, if they exist, will cause SE and/or SF to increase and/or decrease. The nature of the relationship among S668, S668A and changes in SE and SF can be illustrated by applying the operation of the level control mechanism to Table 1. In this regard, in accordance with the configuration of the motor-drive circuit described supra, the magnitude of all non-zero potentials applied to terminal units 367, 369 will be substantially equal. Therefore, the conditions illustrated in Table 1 for which neither P369 nor P367 is zero and the magnitudes of the potential are not equal to one another need not be considered. Thus, Table 2 can be used as a general guide for illustrating the relationships among S668, S668A to changes in SE, SF.

TABLE 2

| s668 | s668A | SE | SF |
|---|---|---|---|
| level | level | NC | NC |
| level | negative | decrease | increase |
| level | positive | increase | increase |
| negative | level | increase | decrease |
| negative | negative | NC | increase |
| negative | positive | increase | NC |
| positive | level | decrease | decrease |
| positive | negative | decrease | NC |
| positive | positive | NC | decrease |

Assuming that knobs 857, 871E are not adjusted while SE and SF are changing S668, S668A will change in direct correspondence to changes in SE and SF. In accordance with the operation set forth in Table 2 and taking into account mechanical and electrical limitations of the support mechanism and level control mechanism, the changes in SE and SF generally will tend to make S668 and S668A level. As indicated in Table 2 when S668 and S668A are both level, there will be no further changes in SE or in SF at which time the apparatus will be "fixed."

As further indicated in the description of the level control mechanism, when S668 and S668A are both level, the readings on the scales of indicator units 837, 869 represent SE, SF respectively. Because the undeviated beam is coincident with axis F, when the apparatus is fixed, the reading on the scales of indicator unit 869 represents the slope of the undeviated beam; e.g., a reading of zero indicates that the undeviated beam is horizontal (has no slope), a reading on scale 879 indicates that the undeviated beam slopes downwardly moving from housing 11 (negative slope), and a reading on scale 881 indicates that the undeviated beam slopes upwardly moving from housing 11 (positive slope). Similarly, because a right-directed beam and a left-directed beam is coincident with axis E when the apparatus is fixed, the reading on the scales of indicator unit 837 represents the slope of a left or right-directed beam; e.g., a reading of zero indicates that the left or right-directed beam has no slope, a reading on scale 847 indicates that a left-directed beam has a positive slope or that a right directed beam has a negative slope, and a reading on scale 849 indicates that a left-directed beam has a negative slope or that a right-directed beam has a positive slope. In all cases, when the apparatus is fixed, the degree of slope is represented by the value of the reading, each value corresponding to a particular degree of slope.

Because an up-directed beam is perpendicular to both axis E and axis F, when the apparatus is fixed, the readings on the scales of indicator units 837, 869 will represent the degree of deviation of the up-directed beam from the vertical in two components; e.g. the reading on the scales of indicator unit 837 will indicate the component of deviation in the direction axis E ("E component of deviation") and the reading on the scales of indicator unit 869 will indicate the component of deviation in the direction of axis F ("F component of deviation"). Thus, if both indicator units have a zero reading, the up-directed beam will be vertical. The degree of the E component of deviation will be represented by the value of the reading of indicator unit 837 and the degree of the F component of deviation will be represented by the value of the reading of indicator unit 869.

Thus, the slope of the undeviated beam and the F component of deviation of the up-directed beam can be set as desired by turning knob 871E until the reading corresponding to the desired slope or deviation is shown on scales 879, 881 of indicator unit 869 and the slope of the left of right-directed beam or the E component of deviation of the up-directed beam can be set as desired by turning knob 857 until the reading corresponding to the desired slope or deviation is shown on scales 847, 849 of indicator unit 837. Immediately upon such adjustment of either or both of knobs 857, 871E, the apparatus will adjust itself in accordance with Table 2 until the apparatus is fixed, at which time the slopes and/or deviations of the beams will be set as desired.

Thus, once the apparatus has been placed on a surface at a particular reference point or location, a pair of orthogona reference lines in the form of light beams can be established and their direction, slope and/or deviation adjusted without repositioning the apparatus, but merely by turning one or more of knobs 428, 609, 857, 871E. Once the beams have been set as desired, they may be used to establish orientational relationships of surfaces and structured components and to position equipment according to methods well-known in the art.

If one or two reference planes are desirable for a particular application of the apparatus, one or two beacon units 1001 must be attached to housing 11 as set forth in the description of the beacon units. In particular, if a substantially vertical plane is desirable, a beacon unit 1001 may be mounted on the front of housing 11 using adapter plate 1113 thus establishing a front plane on the left wall of housing 11 with knob 609 in its extreme counter-clockwise position thus establishing a left plane, or on the right wall of housing 11 with knob 609 in its extreme clockwise position thus establishing a right plane. Because the front plane will be perpendicular to axis F, the deviation of the front plane from the vertical will correspond to SF and will be represented by the reading on the scales of indicator unit 869. Thus, if indicator unit 869 reads zero and the apparatus is fixed, the front plane will be vertical. Similarly, because the left and right planes are perpendicular to axis E, the deviation of the left and right plane from the vertical will correspond to SE and will be represented by the reading on the scales of indicator unit 837. Thus, if indicator unit 837 reads zero and the apparatus is fixed, the left or right plane will be vertical. If a substantially horizontal plane is desirable, a beacon unit may be mounted on top 13 of housing 11 thus establishing a top plane. Because the top plane is perpendicular to axis C the top plane will be sloped from the horizontal in two components, one component in the direction of axis E ("E component of slope") and one component in the direction of axis F ("F component of slope"). Thus, the reading on indicator unit 831 will represent the E component of slope of the top plane and the reading on indicator unit 869 will give the F component of the slope of the top plane. If both indicator units read zero, the top plane will be horizontal.

In accordance with the foregoing, a wide variety of permutations of reference planes and reference lines may be provided by the apparatus of the invention. Furthermore, the apparatus can be adjusted to change from on permutation to another without altering the reference location of the apparatus. For example, a substantially horizontal reference line can be provided by the undeviated beam and combined with (1) a perpendicular substantially horizontal left-directed reference line; (2) a perpendicular substantially horizontal right-directed reference line; (3) a perpendicular substantially vertical up-directed reference line; (4) a substantially vertical left reference plane; (5) a substantially vertical right reference plane; and (6) a substantially horizontal reference plane. Also, a substantially vertical front reference plane can be combined with (1) a substantially horizontal left-directed reference line; (2) a substantially horizontal right-directed reference line; (3) a substantially vertical up-directed reference line; (4) a perpendicular substantially vertical left reference plane; (5) a perpendicular substantially vertical right reference plane; and (6) a perpendicular substantially horizontal top reference plane.

The last-mentioned permutation wherein a substantially vertical front reference plane and a perpendicular, substantially horizontal top reference plane are simultaneously provided has been found to be especially useful in controlling construction equipment having an operating member that moves along a desired path at an adjustable elevation. In particular, the apparatus of the invention is used to keep the member moving along the proper path, or "line," and to keep the member at the proper elevation.

Referring to FIGS. 16 and 17, the apparatus of the invention, having reference number 1201, is illustrated as controlling earth grader 1203. The operating member of grader 1203 is shown as grading blade 1205. The elevation of blade 1205 is controlled by hydraulic blade control motor 1207. Blade control motor 1207 is controlled manually through operation of levers 1209 and automatically through a blade control sensor circuit described infra. The line of blade 1205 is substantially the same as that of grader 1203 as a whole, the line of grader 1203 as a whole being controlled by the alignment of front wheels 1209 which, in turn, are controlled by hydraulic wheel control motor 1211. Wheel control motor 1211 is controlled manually through steering wheel 1213 and automatically through a wheel control sensor circuit described infra. Grader 1203 includes switching systems for alternatively selecting either automatic or manual control of either or both of motors 1207, 1211.

The blade control sensor circuit includes grade detector unit 1215 having a center point and photocells vertically spaced above and below the center point, a grade control amplifier circuit for amplifying the outputs of the photocells of grade detector unit 1215, and a grade control servomechanism for controlling the supply of hydraulic fluid to blade control motor 1207 in accordance with the amplified outputs of the photocells of grade detector unit 1215. Grade detector unit 1215 is attached to blade 1205 above blade 1205 such that the distance from the lower edge of blade 1205 to the centerpoint of grade detector unit 1215 is adjustably fixable. The sensitivity and frequency response of the photocells of grade detector unit 1215, the configuration of the grade control amplifier circuit, the connection between the grade control amplifier circuit and the grade control servomechanism the configuration of the grade control servomechanism, the connection of the grade control servomechanism to motor 1207, and the configuration of motor 1207 should all be selected according to conventional techniques so that (1) when a photocell of grade detector unit 1215 above the center point of such unit is contacted by a beam of light produced by an apparatus such as that of the invention, the elevation of blade 1205 will increase, i.e. blade 1208 will be raised; (2) when a photocell of grade detector unit 1215 below the center point of such unit is contacted by such a beam of light, the elevation of blade 1205 will decrease, i.e., blade 1205 will be lowered; and (3) when the center point of grade detector unit 1215 is contacted by such a beam of light, the elevation of the blade will be held constant.

The wheel control sensor circuit includes line detector unit 1217 having a center point and photocells horizontally spaced to the left and the right of the center point, a line control amplifier circuit for amplifying the outputs of the photocells of line detector unit 1217, and a line control servomechanism for controlling the supply of hydraulic fluid to wheel control motor 1209 in accordance with the amplified outputs of the photocells of line detector unit 1217. Line detector unit 1217 is attached to the frame or body of grader 1203 such that the position of unit 1217 is horizontally fixed with respect to such frame or body and is to either the right or the left of grade detector unit 1215. The sensitivity and frequency response of the photocells of line detector unit 1217, the configurations of the line control amplifier circuit and line control servomechanism of the wheel control sensor circuit, the configuration of motor 1211 and the interconnections between such components should be such that (1) when a photocell of line detector unit 1215 to the left of the center point of line detector unit 1215 is contacted by a beam of light produced by an apparatus such as that of the invention, wheels 1209 will be turned by motor 1211 so as to direct grader 1203 to the left when grader 1203 is moving forward; (2) when a photocell of line detector unit 1215 to the right of the center point of line detector unit 1215 is contacted by such a beam, wheels 1209 will be turned by motor 1211 so as to direct grade 1203 to the right when grader 1203 is moving forward; and (3) when the center point of line detector unit 1215 is contacted by such a beam, wheels 1209 are set by motor 1211 so as to direct grader 1203 in a straight path. All directions in the preceding sentence are with reference to viewing grader 1203 from the front.

Sensor circuits such as those described in the two preceding paragraphs are well known in the prior art and the precise design of such circuits are within the knowledge of those skilled in the art. The use of two of such sensor circuits on a single apparatus, however, is not known in the prior art.

The apparatus of the invention can be used to control grader 1203 such that, as grader 1203 moves forward, blade 1205 will cut a path of a desired grade along a desired line. First, at least one benchmark is established along one side of the path to be graded and two rods are positioned along the line of the path. Preferably one of such rods should be placed beyond one end of the path. Second, a supporting platform, such as tripod 1219, is positioned between the rods and, preferably, beyond one end of the path. The upper surface of the platform should be approximately horizontal, but it need not be absolutely horizontal. Third, the apparatus of the invention, with a front beacon and a top beacon attached as described supra, is placed on the upper surface of the platform. Knob 871E is adjusted so that the scales of indicator unit 869 read zero. Knob 857 is adjusted so that the scales of indicator unit 837 provide the reading corresponding to the grade of the path to be cut. Thus, when power is supplied to the apparatus, including the beacons, the front beacon will provide a vertical reference plane and the top beacon will provide a reference plane having a grade corresponding to that of the path to be cut.

The apparatus is then moved on the platform until the transverse passage of the turret of the front beacon is positioned along the line of the path to be graded. Knob 428 is then adjusted until the beam directed from the front beacon strikes both of the rods. At such time, the front beacon will establish a vertical reference plane that includes the line of the path to be graded. The height of the platform is then adjusted until the beam directed from the top beacon strikes the benchmarks. At such time, the front beacon will establish a plane parallel to that of the path to be graded and a known height above such path as established by the benchmark.

The height of the center point grade level detector 1215 with respect to the lower edge of blade 1205 so that such height corresponds to the height of the benchmark with respect to the elevation of the path to be graded. Grader 1203 is then manually positioned at the beginning of the path such that the beam provided by the front beacon passes through the center point of line detector unit 1217, and blade 1205 is positioned such that the beam provided by the top beacon passes through the center point of grade detector unit 1215. The switching system of grader 1203 is then adjusted such that motors 1207, 1211 are set for automatic control and power is applied to the wheels of grader 1203 to set it in motion along the path to be graded.

Grader 1203 will then move along the path to be graded. The resultant path will have both the desired line and the desired grade. If, viewing the grader 1203 from the front, grader 1203 moves off the desired line to the left, the photocells to the right of the center point of line detector unit 1217 will be contacted by the beam directed from the front beacon of the apparatus whereby wheels 1209 will turn and direct grader 1203 to the right thus returning grader 1203 back on line. Similarly, if grader 1203 moves off line to the right, the photocells to the left of the center point of line detector unit 1217 will be contacted by the beam directed from the front beacon of the apparatus whereby wheels 1209 will turn and direct grader 1203 to the left thus returning grader 1203 back on line. In either case, when grader 1203 is back on line, the center point of line detector unit 1217 will be contacted by the beam directed from the front beacon of the apparatus and wheels 1209 will be set to direct grader 1203 in a straight path. Thus, grader 1203 will be held on line by the beam directed from the front beacon.

If the elevation of blade 1205 should move above the elevation for the desired grade, the photocells below the center point of grade detector unit 1215 will be contacted by the beam directed from the top beacon of the apparatus whereby blade 1203 will be lowered toward the proper elevation for the desired grade. If the elevation of blade 1205 should move below the elevation for the desired grade, the photocells above the center point of grade detector unit 1215 will be contacted by the beam directed from the top beacon of the apparatus whereby blade 1205 will be raised toward the proper elevation for the desired grade. In either case, when blade 1205 returns to the proper elevation for the desired grade, the center point of grade detector unit 1215 will be contacted by the beam directed from the top beacon of the apparatus and blade 1205 will remain at such proper elevation. Thus, blade 1205 will be kept at the proper elevation for the desired grade by the beam directed from the top beacon of the apparatus.

It should be noted that the method described can also be used to control the line and grade of a path cut by the blade of a bulldozer and to control the line and the depth of a trench dug by a trencher.

10. Summary

Although the apparatus described in detail supra has been found to be most satisfactory and preferred, many variations in structure are possible. Because many varying and different embodiments may be made within the scope of the inventive concept herein taught, and because many variations may be made in the embodiment herein detailed in accordance with the descriptive requirements of the law, it should be understood that the details herein are to be interpreted as illustrative and not in a limiting sense.

What is claimed as invention is:

1. An apparatus for providing a plurality of detectable reference lines, comprising:
    an elongate housing;
    a source of a coherent source beam of light positioned within said housing;
    a beam splitter for splitting said source beam into a first beam directed along a first axis and a second beam directed along a second axis;
    support means for supporting said housing on a surface, said support means including a plurality of feet for contacting such surface and adjustment means for adjusting the orientation of said housing with respect to said surface without substantially changing the position of said feet with respect to said surface;
    grade control means for detecting the orientation of said first and second axes with respect to the horizontal and adjusting said adjustment means in accordance with such detection;
    wherein said adjustment means includes a front support mechanism pivotally connected to one end of said housing, said front support mechanism including three perpendicular pivot axes; and
    wherein said adjustment means includes a base unit fixedly attached to said feet and plunger means for connecting said base unit to said housing, said plunger means including a first plunger cylinder connected to said housing and a first plunger rod axially movably disposed within said first plunger cylinder, said first plunger rod being attached at one end to said base unit, said plunger means further including drive means for moving said first plunger rod axially within said first plunger cylinder.

2. The apparatus of claim 1 wherein said first plunger cylinder is rotatable with respect to said housing, said first plunger rod is threadedly received within said first plunger cylinder, and said first plunger rod is non-rotatable with respect to said housing whereby rotation of said first plunger cylinder will cause said first plunger rod to move in and out of said first plunger cylinder.

3. The apparatus of claim 2 wherein said base unit includes a rotatable threaded control shaft and said first plunger rod is threadedly connected to said control shaft whereby rotation of said control shaft will cause said first plunger rod to move axially along said control shaft.

4. The apparatus of claim 2 wherein said drive means includes a first electric motor for rotating said first plunger cylinder and said grade control means includes transductive means for providing an electrical potential to said motor that varies according to the orientation of said housing with respect to the horizontal.

5. The apparatus of claim 4 wherein said transductive means includes a transducer for providing an output of electrical significance that varies in accordance with the orientation of said transducer with respect to the horizontal and support means for supporting said transducer in said housing such that the orientation of said transducer with respect to said housing can be varied.

6. The apparatus of claim 5 wherein said transducer includes a gravity-sensing electrolytic potentiometer and said transductive means further includes electronic means for providing an electrical potential to said first motor in response to the output of said potentiometer.

* * * * *